US008313802B2

(12) United States Patent
Riman et al.

(10) Patent No.: US 8,313,802 B2
(45) Date of Patent: Nov. 20, 2012

(54) METHOD OF HYDROTHERMAL LIQUID PHASE SINTERING OF CERAMIC MATERIALS AND PRODUCTS DERIVED THEREFROM

(75) Inventors: Richard E. Riman, Belle Mead, NJ (US); Vahit Atakan, West Windsor, NJ (US)

(73) Assignee: Rutgers, The State University of New Jersey, New Brunswick, NJ (US)

( * ) Notice: Subject to any disclaimer, the term of this patent is extended or adjusted under 35 U.S.C. 154(b) by 544 days.

(21) Appl. No.: 12/271,513

(22) Filed: Nov. 14, 2008

(65) Prior Publication Data

US 2009/0142578 A1 Jun. 4, 2009

Related U.S. Application Data

(60) Provisional application No. 61/003,272, filed on Nov. 15, 2007.

(51) Int. Cl.
*B05D 5/00* (2006.01)
*B05D 7/22* (2006.01)
(52) U.S. Cl. ........ 427/230; 427/238; 427/337; 427/343; 427/344
(58) Field of Classification Search .......... 427/230–239, 427/333, 337, 343, 344
See application file for complete search history.

(56) References Cited

U.S. PATENT DOCUMENTS

| | | | |
|---|---|---|---|
| 3,632,624 A | 1/1972 | Anderson et al. | |
| 4,350,567 A | 9/1982 | Moorehead et al. | |
| 4,501,618 A | 2/1985 | Gebhard et al. | |
| 4,595,465 A | 6/1986 | Ang et al. | |
| 5,252,127 A | 10/1993 | Pichat | |
| 5,298,475 A | 3/1994 | Shibata et al. | |
| 5,395,561 A | 3/1995 | Ukawa et al. | |
| 5,449,533 A * | 9/1995 | Morizane ...................... 427/344 |
| 5,502,021 A | 3/1996 | Schuster | |
| 5,518,540 A | 5/1996 | Jones, Jr. | |
| 5,650,562 A | 7/1997 | Jones, Jr. | |
| 5,769,940 A | 6/1998 | College | |
| 5,779,464 A | 7/1998 | Fan et al. | |
| 5,830,815 A | 11/1998 | Wagh et al. | |
| 5,897,702 A | 4/1999 | Thomson et al. | |
| 5,958,353 A | 9/1999 | Eyal | |
| 5,965,201 A | 10/1999 | Jones, Jr. | |
| 5,987,704 A | 11/1999 | Tang | |
| 5,997,629 A | 12/1999 | Hills | |
| 6,271,172 B2 | 8/2001 | Ohashi et al. | |
| 6,447,437 B1 | 9/2002 | Lee et al. | |
| 6,648,551 B1 | 11/2003 | Taylor | |
| 6,787,023 B1 | 9/2004 | Mohr et al. | |
| 7,067,456 B2 | 6/2006 | Fan et al. | |
| 7,125,530 B2 | 10/2006 | Biedenkopf et al. | |
| 7,132,090 B2 | 11/2006 | Dziedzic et al. | |
| 7,141,093 B2 | 11/2006 | Charette | |
| 7,314,847 B1 | 1/2008 | Siriwardane | |
| 7,390,444 B2 | 6/2008 | Ramme et al. | |
| 7,399,339 B2 | 7/2008 | Fan et al. | |
| 7,618,606 B2 | 11/2009 | Fan et al. | |
| 7,666,374 B2 | 2/2010 | Grochowski | |
| 7,722,842 B2 | 5/2010 | Park et al. | |
| 7,753,618 B2 | 7/2010 | Constantz et al. | |
| 7,795,175 B2 | 9/2010 | Olah et al. | |
| 7,820,591 B2 | 10/2010 | Ryu et al. | |
| 2005/0209088 A1* | 9/2005 | Tani ................................ 501/80 |
| 2006/0185560 A1 | 8/2006 | Ramme et al. | |
| 2007/0020955 A1 | 1/2007 | Song et al. | |
| 2007/0149398 A1 | 6/2007 | Jones et al. | |
| 2008/0245274 A1 | 10/2008 | Ramme | |
| 2009/0020044 A1 | 1/2009 | Constantz et al. | |
| 2009/0081093 A1 | 3/2009 | Comrie | |
| 2009/0104349 A1 | 4/2009 | Hills et al. | |
| 2009/0143211 A1 | 6/2009 | Riman et al. | |
| 2009/0304566 A1 | 12/2009 | Golden et al. | |
| 2010/0024686 A1 | 2/2010 | Constantz et al. | |
| 2010/0132549 A1 | 6/2010 | Yaghi et al. | |
| 2010/0132591 A1 | 6/2010 | Constantz et al. | |
| 2010/0135882 A1 | 6/2010 | Constantz et al. | |

(Continued)

FOREIGN PATENT DOCUMENTS

BE 1006908 A3 1/1995

(Continued)

OTHER PUBLICATIONS

Monkman et al., "Assessing the Carbonation Behavior of Cementitious Materials", Journal of Materials in Civil Engineering, Nov. 2006, pp. 768-776.
Monkman et al., "Carbonated Ladle Slag Fines for Carbon Uptake and Sand Substitute", Journal of Materials in Civil Engineering, Nov. 2009, pp. 657-665.
Monkman et al., "Carbonation Curing of Slag-Cement Concrete for Binding CO2 and Improving Performance", Journal of Materials in Civil Engineering, Apr. 2010, pp. 296-304.
Liu et al., "Development of CO2 solidification method for recycling autoclaved lightweight concentrate waste", Journal of Material Science Letters in Civil Engineering, 2001, pp. 1791-1794.
Teramura et al, "New Building Material from Waste Concrete by Carbonation", Journal of Material Civil Engineering, Nov. 2000, pp. 288-293.

(Continued)

*Primary Examiner* — William Phillip Fletcher, III
(74) *Attorney, Agent, or Firm* — McKenna Long & Aldridge LLP

(57) ABSTRACT

Provided here is a method of producing a monolithic body from a porous matrix, comprising: (i) providing a porous matrix having interstitial spaces and comprising at least a first reactant; (ii) contacting the porous matrix with an infiltrating medium that carries at least a second reactant; (iii) allowing the infiltrating medium to infiltrate at least a portion of the interstitial spaces of the porous matrix under conditions that promote a reaction between the at least first reactant and the at least second reactant to provide at least a first product; and (iv) allowing the at least first product to form and fill at least a portion of the interstitial spaces of the porous matrix, thereby producing a monolithic body, wherein the monolithic body does not comprise barium titanate.

21 Claims, 3 Drawing Sheets

U.S. PATENT DOCUMENTS

2010/0247410 A1    9/2010   Constantz et al.

FOREIGN PATENT DOCUMENTS

| JP | 2001253785 A | 9/2001 |
|---|---|---|
| JP | 2006213559 | 8/2006 |
| NZ | 224284 | 11/1990 |
| NZ | 239525 | 11/1993 |
| WO | WO 98/53026 | 11/1998 |
| WO | WO-00/38910 | 7/2000 |
| WO | 2005070521 A1 | 8/2005 |
| WO | 2007106883 A2 | 9/2007 |
| WO | WO-2009/065031 | 5/2009 |
| WO | 2009132692 A1 | 11/2009 |
| WO | 2009133120 A2 | 11/2009 |

OTHER PUBLICATIONS

Shiomi et al., "Effect of Mechano-Chemical Treatment on Consolidation of CaSiO3 by Carbonation", J. Soc. Mat. Sci., Japan, vol. 51, No. 6, pp. 610-616, Jun. 2002.

Nakamura et al., "High Temperature Deformation and Dislocation Structure of a-AI2O3 Single Crystals", J. Soc. Mat. Sci., Japan, vol. 51, No. 6, pp. 617-621, Jun. 2002.

SciFinder Scholar database searched under "Cement-Carbonate-Carbon Dioxide", Jun. 29, 2007 pp. 1-993.

SciFinder Scholar database searched under "Hydrothermal Sintering", Aug. 23, 2007 pp. 1-16.

SciFinder Scholar database searched under "Carbon Dioxide in Cement", Oct. 10, 2007 pp. 1-2.

SciFinder Scholar database searched under "Cements/Geopolymers_Czech", Oct. 10, 2007 pp. 1-5.

SciFinder Scholar database searched under "Geopolymers and Carbon Dioxide", Oct. 10, 2007 pp. 1-8.

SciFinder Scholar database searched under "Geopolymers", Oct. 10, 2007 pp. 1-9.

SciFinder Scholar database searched under "Carbon Capture and Amine Sorbents", Jan. 3, 2008, pp. 1-70.

SciFinder Scholar database searched under "Carbon Capture and Calcium Carbonate", Jan. 3, 2008, pp. 1-31.

SciFinder Scholar database searched under "Carbon Capture and Calcium Sulfate", Jan. 3, 2008, pp. 1-6.

SciFinder Scholar database searched under "Carbon Capture and Ammonium Carbonate", Jan. 3, 2008, pp. 1-4.

SciFinder Scholar database searched under "C02 Capture, Carbonates and Chloride", Jan. 3, 2008, pp. 1-13.

SciFinder Scholar database searched under "Carbon Capture and Carbonates", Jan. 3, 2008, pp. 1-88.

SciFinder Scholar database searched under "Carbon Capture and FeCO3", Jan. 3, 2008, pp. 1-2.

SciFinder Scholar database searched under "Carbon Capture and Hydrothermal", Jan. 3, 2008, pp. 1-3.

SciFinder Scholar database searched under "Carbon Capture and Oxalate", Jan. 3, 2008, pp. 1-2.

SciFinder Scholar database searched under "Carbon Capture and Sequestration", Jan. 3, 2008, pp. 1-132.

SciFinder Scholar database searched under "Carbon Capture and Sintering", Jan. 3, 2008, pp. 1-61.

SciFinder Scholar database searched under "Carbon Capture and solid sorbents", Jan. 3, 2008, pp. 1-32.

SciFinder Scholar database searched under "Carbon Capture and Storage", Jan. 3, 2008, pp. 1-128.

SciFinder Scholar database searched under "Carbon Capture and MgC03", Jan. 4, 2008, pp. 1-3.

SciFinder Scholar database searched under "Oxalate-electrochemical", Jan. 14, 2008, pp. 1-2.

SciFinder Scholar database searched under "Oxalate for Sequestration", Jan. 14, 2008, pp. 1-4.

SciFinder Scholar database searched under "Oxalate—Texaco", Jan. 4, 2008, pp. 1-4.

SciFinder Scholar database searched under "Solar Oxalate", Jan. 14, 2008, pp. 1-2.

SciFinder Scholar database searched under "Carbonation of Concrete, restricted to 2000 and on", Jan. 21, 2008, pp. 1-417.

SciFinder Scholar database searched under "Slag and Carbon Dioxide", Jun. 17, 2008, pp. 1-768.

SciFinder Scholar database searched under "Slags-Carbon Dioxide-Construction Materials", Jun. 17, 2008, pp. 1-95.

SciFinder Scholar database searched under "Lime Cement—Carbon Dioxide", Jul. 2, 2008, pp. 1-98.

SciFinder Scholar database searched under "Hills—all papers", Nov. 30, 2010, pp. 1-27.

SciFinder Scholar database searched under "Hills", Nov. 30, 2010, pp. 1-13.

SciFinder Scholar database searched under "Teramura limited to carbonate", Nov. 30, 2010, pp. 1-11.

SciFinder Scholar database searched under "Teramura Work", Nov. 30, 2010, pp. 1-34.

SciFinder Scholar database searched under "Carbon Capture and Amine and MEA", Jan. 3, 2008, pp. 1-20.

SciFinder Scholar database searched under "Carbon Capture and K2CO3", Jan. 3, 2008, pp. 1-12.

SciFinder Scholar database searched under "Carbon Capture Na2C03", 101/03/2008, pp. 1-15.

SciFinder Scholar database searched under "Solidification of McC03", Jan. 4, 2008, pp. 1-2.

Klaus S. Lackner, "Carbon dioxide disposal in carbonate minerals", Energy Pergamon Press, Oxford, GB, vol. 20, No. 11, Jan. 1, 1995.

International Search Report (PCT/US2008/083606) dated Nov. 26, 2009.

Riman, et al. "Hydrothermal Crystallization of Ceramics" Ann. Chim. Sci. Mat., 2002, vol. 27, No. 6, pp. 15-36. (XP004448537).

* cited by examiner

METHOD OF HYDROTHERMAL LIQUID PHASE SINTERING OF CERAMIC MATERIALS AND PRODUCTS DERIVED THEREFROM

RELATED APPLICATION

This application claims priority to U.S. provisional patent application Ser. No. 61/003,272 filed Nov. 15, 2007, which is herein incorporated by reference in its entirety.

BACKGROUND

A number of previously known infiltration procedures have been used to produce multicomponent ceramics or ceramic composites. These procedures include: (1) metal-matrix infiltration, (2) melt processing, (3) chemical vapor infiltration (CVI), (4) nitridation, (5) chemically bonded ceramic processing, and (6) ceramic hardening infiltration. All six methods may be used to infiltrate a porous fiber or a previously shaped ceramic particulate matrix or preform. However, the porosity of the initial fiber or preform in these methods often needs to be minimized at the beginning of each process so that the shape of the sintered product does not differ substantially from that of the initial preform.

Also, the prior efforts often rely on multiple-step processing methods that comprise shaping of a filler or preform of ceramic compounds, such as whiskers, fibers or particulates and the infiltration of this compact or bed of ceramic filler by a liquid or molten infiltrant or a gas (CVI). The ceramic body or bed should be sufficiently wettable by the infiltrant and have a certain portion of interconnected open porosity to enable the infiltration to occur by capillarity. The infiltrant may have to be heated or melted a number of times at a high temperature and/or pressure to have sufficient fluidity to infiltrate a compact or the bed of a filler.

Thus, a need exists for a sintering process that can be performed at relatively mild temperature and pressure conditions. Preferably, such process is low in costs, is versatile, and is able to accommodate various materials, reagents, and shapes and sizes of the desired end products.

SUMMARY OF THE INVENTION

In one embodiment of the invention, a method of producing a monolithic body from a porous matrix is provided, the method comprising: (i) providing a porous matrix having interstitial spaces and comprising at least a first reactant; (ii) contacting the porous matrix with an infiltrating medium that carries at least a second reactant; (iii) allowing the infiltrating medium to infiltrate at least a portion of the interstitial spaces of the porous matrix under conditions that promote a reaction between the at least first reactant and the at least second reactant to provide at least a first product; and (iv) allowing the at least first product to form and fill at least a portion of the interstitial spaces of the porous matrix, thereby producing a monolithic body, wherein the first product does not comprise barium titanate, $BaTiO_3$.

Another embodiment provides a method of producing a non-barium titanate sintered ceramic, the method comprising: (i) providing a porous matrix having interstitial spaces and comprising at least a first reactant; (ii) contacting the porous matrix with an infiltrating medium that carries at least a second reactant; (iii) allowing the infiltrating medium to infiltrate at least a substantial portion of the interstitial spaces of the porous matrix under conditions that include a reaction temperature of less than about 1000° C., and a reaction pressure of less than about 70000 psi, and which promote a reaction between the at least first reactant and the at least second reactant to provide at least a first product; and (iv) allowing the first product to form and fill at least a substantial portion of the interstitial spaces of the porous matrix, thereby producing a non-barium titanate sintered ceramic.

One embodiment provides a composition produced by a hydrothermal liquid phase sintering process, which process comprises allowing at least one component of a porous matrix to undergo a reaction with at least a first reactant carried by a liquid to provide at least a first product, during which reaction a remainder of the porous matrix acts as a scaffold for facilitating the formation of the first product from the liquid, thereby producing a hydrothermal liquid phase sintered composition. In a preferred embodiment, this sintered composition does not include barium titanate.

Another embodiment provides a method of producing a composition, the method comprising: (i) providing a porous matrix having a molar volume; (ii) immersing at least a portion of the porous matrix in a solvent having a reactant; and (iii) forming a product by reacting at least some of the reactant with at least a portion of the matrix, wherein the product has a molar volume, and wherein the molar volume of the matrix before step (iii) is substantially the same as the molar volume of the product after step (iii). In yet another embodiment, the molar volumes between the matrix and the product may be different, either increasing or decreasing.

Another embodiment provides a process involving manipulating the components of the solid matrix or the infiltrating medium to create a sintered, multicomponent ceramic product that retains the same shape as the solid matrix. In one further embodiment, the overall size or volume is also retained substantially in going from the solid matrix (or "green compact") to the ceramic product.

DETAILED DESCRIPTION OF THE INVENTION

Figure 1:
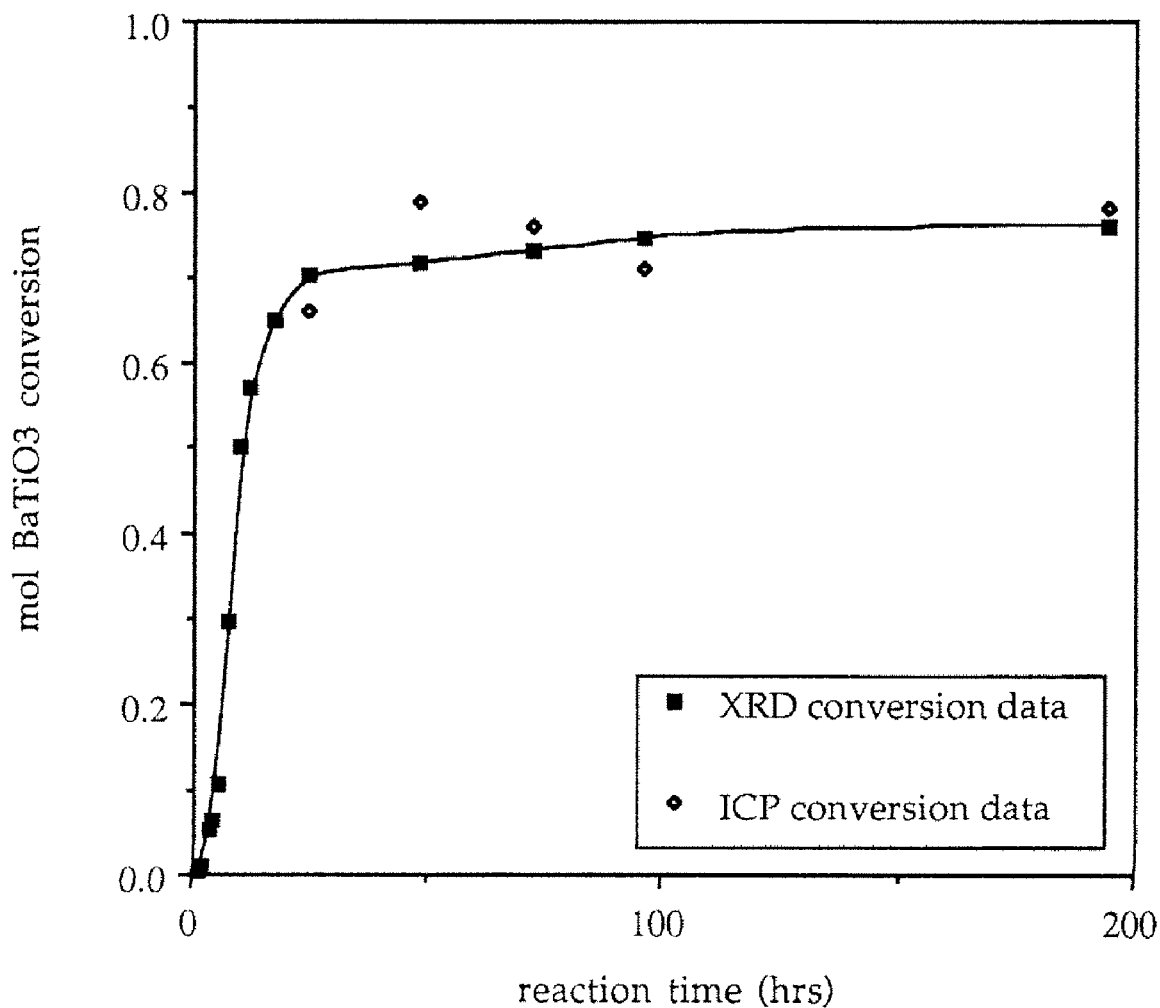
FIG. 1 shows a typical graph of the fractional molar conversion of matrix into product as a function of the infiltration time for an ion addition reaction in one embodiment.

All references cited herein are incorporated by reference in their entirety.

General Conditions for Hydrothermal Liquid Phase Sintering

In a preferred embodiment of hydrothermal liquid phase sintering (HLPS), a "green" or partially sintered, porous, solid matrix having contiguous interstitial pores can be transformed into a sintered ceramic by the action of a liquid phase infiltrating medium. HLPS can be carried out under relatively mild conditions, frequently not exceeding the temperature and pressure encountered in a functioning autoclave. HLPS can be performed in a wide range of temperatures and pressures. For example, in some embodiments, the HLPS conditions can include temperature less than about 2000° C., such as less than about 1000° C., such as less than about 500° C., such as less than about 200° C., such as less than about 100° C., such as less than about 50° C., such as room temperature. The reaction pressure can be less than about 100000 psi, such as less than 70000 psi, such as less than about 50000 psi, such as less than about 10000 psi, such as less than about 5000 psi, such as less than about 1000 psi, such as less than about 500 psi, such as less than about 100 psi, such as less than about 50 psi, such as less than about 10 psi. In one embodiment, the hydrothermal sintering process can be carried out at a temperature in the range of about 80° C. to about 180° C. and a pressure in the range of about 1 to about 3 atmospheres (1 atmosphere is about 15 psi).

In theory, any starting material that is capable of undergoing a hydrothermal reaction with an infiltrating species to produce a different substance may be used to produce the hydrothermally sintered product. Hence, a wide variety of starting materials may be selected, depending on the contemplated end use, formed into a porous solid matrix having the desired shape and size and, subsequently, subjected to the steps of the instant method for transformation into the sintered finished product.

In one embodiment, the porous solid matrix is derived from a metal oxide powder. The powder may be amorphous or crystalline, preferably crystalline. Moreover, the metal oxide powder may have a wide range of particulate sizes ranging from a mean particle size of about 0.01 micron to about 100 microns, including for example about 0.02 to about 50 microns, such as about 0.04 to about 20 microns, such as about 0.08 to about 10 microns. In one embodiment, the powder has a mean particle size ranging from about 0.1 micron to about 5 microns.

The metal in the metal oxide can be chosen from an oxide of a Group Ia metal, Group IIb metal, Group IIIb metal, Group IVb metal, Group Vb metal, transition metal, lanthanide metal, actinide metal or mixtures thereof. Preferably, the chosen metal oxide or the sintered finished product can have potential chemical, ceramic, magnetic, electronic, superconducting, mechanical, structural or even biological applications. The sintered finished product can have industrial or household utility. The finished product need not necessarily comprise the same material as the reactants. For example, a product substantially free of barium titanate may be produced by reactants that comprise barium and/or titanium. In one exemplary embodiment, the barium and/or titanium comprising reactant (or reactants) act mostly as an intermediate reaction species, thus is not included in the final product.

"Hydrothermal reaction" described herein can include transformations taking place in aqueous or nonaqueous liquid media. Furthermore, such transformations may include the dissolution and re-precipitation of the same chemical species, the dissolution of one chemical species and its combination with a second chemical species to form a composite material in which the initial chemical species remain distinct, or the reaction of one chemical species with a second chemical species to produce a new chemical moiety that is distinct from the starting species. The hydrothermal sintering process thus can fill the interstitial spaces or voids in a porous solid matrix with a moiety by precipitation (or re-precipitation), ion addition, ion substitution, or a combination thereof. The moiety can comprise the same chemical species as that in the solid matrix, a composite resulting from the co-re-precipitation of two distinct chemical species, a new product resulting from a reaction between two chemical species, a re-precipitated material derived from an infiltrant species contained in the medium, or a combination thereof.

In one embodiment, HLPS can be carried out under conditions in which at least a portion of the mass of the green porous solid matrix reacts with preselected infiltrant species present in the medium to produce a new product. For example, the porous solid matrix and the infiltrant species can be selected such that the following representative reactions take place to yield the indicated wide range of functional and structural ceramic products. The more generalized form of these unbalanced reactions are defined later in the Specification:

(i) Ferroelectric—$Pb(Zr,Ti)O_3$ $1.1Pb^{2+} + xZr(OH)_4 + (1-x)TiO_2 \rightarrow Pb(Zr_x,Ti_{1-x})O_3$ (ii) Ferroelectric—$BaSnO_3$ $1.1Ba^{2+} + 1SnO_2 \rightarrow BaSnO_3$ (iii) Magnetic—$CoFe_2O_4$ $2.2Fe^{2+} + \frac{1}{2}Co_2O_3 \rightarrow CoFe_2O_4$ (iv) Catalystic—$NiMoO_4$ $1NiO + 1.1MoO_4 \rightarrow NiMoO_4$ (v) Ceramic—$SrCrO_4$ $1Sr^{2+} + 0.55Cr_2O_7 \rightarrow SrCrO_4$ (vi) Biological—$Ca_{10}(PO_4)_6(OH)_2$ $4Ca^{2+} + 3Ca_2P_2O_7 + H_2O \rightarrow Ca_{10}(PO_4)_6(OH)_2$ (vii) Ceramic—$SrTiO_3$ $1.1Sr^{+2} + 1TiO_2 \rightarrow SrTiO_3$ (viii) Ceramic—$Ba_{0.5}Sr_{0.5}TiO_3$ $0.55Ba^{2+} + 0.55Sr^{2+} + 1TiO_2 \rightarrow Ba_{0.5}Sr_{0.5}TiO_3$ (ix) Ceramic—$BaTiO_3$ $1.1Ba^{2+} 1TiO_2 \rightarrow BaTiO_3$ (x) Ceramic—$BaZr_{0.1}Ti_{0.9}O_3$ $1.1Ba^{2+} + 0.11Zr^{+4} + 0.9TiO_2 \rightarrow BaZr_{0.1}Ti_{0.9}O_3$ (xi) Ceramic—$Ba_{0.87}Ca_{0.13}Ti_{0.88}Zr_{0.12}O_3$ $0.96Ba^{2+} + 0.14Ca^{+2} + 0.13Zr^{+4} + 0.88TiO_2 \rightarrow Ba_{0.87}Ca_{0.13}Ti_{0.88}Zr_{0.12}O_3$ Preparation of the Porous Solid Matrix The solid matrix can comprise a material that does not dissolve in a solution easily. If the matrix is soluble in water, the conditions can be selected such that the solubility of the matrix will be decreased by changing the temperature or by adding a non-aqueous liquid such as alcohols or other solvents as discussed in preparation of infiltrant medium section of the document. In one embodiment, the porous solid matrix is derived from powder. The powder can be of any kind. For example, it can be a metal oxide powder. Examples of suitable metal oxide powders can include, the oxides of berylium (e.g., BeO), magnesium (e.g., MgO), calcium (e.g., CaO, $CaO_2$), strontium (e.g., SrO), barium (e.g., BaO), scandium (e.g., $Sc_2O_3$), titanium (e.g., TiO, $TiO_2$, $Ti_2O_3$), aluminum (e.g., $Al_2O_3$), vanadium (e.g., VO, $V_2O_3$, $VO_2$, $V_2O_5$), chromium (e.g., CrO, $Cr_2O_3$, $CrO_3$, $CrO_2$), manganese (e.g., MnO, $Mn_2O_3$, $MnO_2$, $Mn_2O_7$), iron (e.g., FeO, $Fe_2O_3$), cobalt (e.g., CoO, $CO_2O_3$, $CO_3O_4$), nickel (e.g., NiO, $Ni_2O_3$), copper (e.g., CuO, $Cu_2O$), zinc (e.g., ZnO), galluim (e.g., $Ga_2O_3$, $Ga_2O$), germanium (e.g., GeO, $GeO_2$), tin (e.g., SnO, $SnO_2$), antimony (e.g., $Sb_2O_3$, $Sb_2O_5$), indium (e.g., $In_2O_3$), cadium (e.g., CdO), silver (e.g., $Ag_2O$), bismuth (e.g., $Bi_2O_3$, $Bi_2O_5$, $Bi_2O_4$, $Bi_2O_3$, BiO), gold (e.g., $Au_2O_3$, $Au_2O$), zinc (e.g., ZnO), lead (e.g., PbO, $PbO_2$, $Pb_3O_4$, $Pb_2O_3$, $Pb_2O$), rhodium (e.g., $RhO_2$, $Rh_2O_3$), yttrium (e.g., $Y_2O_3$), ruthenium (e.g., $RuO_2$, $RuO_4$), technetium (e.g., $Ti_2O$, $Ti_2O_3$), molybdenum (e.g., $MoO_2$, $Mo_2O_5$, $Mo_2O_3$, $MoO_3$), neodymium (e.g., $Nd_2O_3$), zirconium (e.g., $ZrO_2$), lanthanum (e.g., $La_2O_3$), hafnium (e.g., $HfO_2$), tantalum (e.g., $TaO_2$, $Ta_2O_5$), tungsten (e.g., $WO_2$, $W_2O_5$), rhenium (e.g., $ReO_2$, $Re_2O_3$), osmium (e.g., PdO, PdO$_2$), iridium (e.g., IrO$_2$, IR$_2$O$_3$), platinum (e.g., PtO, PtO$_2$, PtO$_3$, Pt$_2$O$_3$, Pt$_3$O$_4$), mercury (e.g., HgO, Hg$_2$O), thallium (e.g., TiO$_2$, Ti$_2$O$_3$), palladium (e.g., PdO, PdO$_2$) the lathanide series oxides, the actinide series and the like. Some of the examples are provided in Table 1. Moreover, depending upon the particular application involved, mixtures of metal oxides may also be used in making the preform.

TABLE 1

Molar Volume Change Of The Samples That Have A Solid Matrix Comprising A Metal Oxide.

| Matrix | Molar volume of matrix | Product | Molar volume of product | % molar volume change |
|---|---|---|---|---|
| BeO | 8.31 | BeSO4 | 42.03 | 405.82 |
| BeO | 8.31 | BeSO4•4H2O | 103.59 | 1,146.65 |
| Magnesium Oxide | 11.26 | — | — | — |
| MgO | 11.26 | MgCO3 | 27.64 | 145.51 |
| MgO | 11.26 | MgSO4 | 45.25 | 301.88 |
| MgO | 11.26 | MgC2O4—2H2O | 60.56 | 437.79 |
| 3MgO | 33.78 | Mg3(PO4)2—8H20 | 187.55 | 455.21 |
| MgO | 11.26 | MgAl2O4 | 40.07 | 255.91 |
| Scandium Oxide | 35.69 | — | — | — |
| Sc2O3 | 35.69 | ScPO4 | 37.72 | 5.67 |
| Strontium Oxide | reacts w/H2O | — | — | — |
| Y2O3 | 44.89 | Y2(SO4)3•8H2O | 234.66 | 422.72 |
| (½)Y2O3 | 22.45 | YPO4 | 38.71 | 72.46 |
| (³⁄₂)Y2O3 | 67.34 | Y3Al5O12 | 131.92 | 95.90 |
| (³⁄₂)Y2O3 | 67.34 | Y3Fe5O12 | 142.73 | 111.96 |
| Titanium Oxide | 19.15 | — | — | — |
| TiO2 | 19.15 | MgTiO3 | 31.21 | 62.96 |
| TiO2 | 19.15 | CaTiO3 | 34.16 | 78.33 |
| TiO2 | 19.15 | SrTiO3 | 35.98 | 87.84 |
| TiO2 | 19.15 | BaTiO3 | 38.74 | 102.24 |
| TiO2 | 19.15 | MgTiO3 | 33.14 | 73.04 |
| TiO2 | 19.15 | FeTiO3 | 32.14 | 67.81 |
| TiO2 | 19.15 | NiTiO3 | 30.91 | 61.39 |
| Zirconium(IV) Oxide | 21.69 | — | — | — |
| ZrO2 | 21.69 | Zr(SO4)2 | 88.00 | 305.63 |
| Vanadium(III) Oxide | 30.78 | — | — | — |
| V2O3 | 30.78 | MgV2O4 | 44.23 | 43.71 |
| Vanadium(V) Oxide | 54.29 | — | — | — |
| V2O5 | 54.29 | Mg2V2O7 | 84.67 | 55.96 |
| Chromium(III) Oxide | 29.12 | — | — | — |
| Cr2O3 | 29.12 | Cr2(SO4)3 | 52.68 | 80.93 |
| Cr2O3 | 14.56 | CrC2O4•H2O | 64.03 | 339.82 |
| Cr2O3 | 14.56 | CrPO4 | 31.95 | 119.46 |
| Cr2O3 | 29.12 | MgCr2O4 | 43.70 | 50.10 |
| Cr2O3 | 29.12 | FeCr2O4 | 44.77 | 53.75 |
| Cr2O3 | 14.56 | CoCrO4 | 44.15 | 203.25 |
| Cr2O3 | 14.56 | CuCrO4 | 42.88 | 194.52 |
| Cr2O3 | 29.12 | ZnCr2O4 | 44.12 | 51.53 |
| Manganese(II) Oxide | 13.21 | — | — | — |
| MnO | 13.21 | MnCO3 | 31.07 | 135.20 |
| MnO | 13.21 | MnSO4 | 46.46 | 251.75 |
| MnO | 13.21 | MnC2O4•2H2O | 73.06 | 453.09 |
| Iron(II) Oxide | 11.97 | — | — | — |
| FeO | 11.97 | FeCO3 | 29.37 | 145.33 |
| FeO | 11.97 | FeSO4 | 41.62 | 247.59 |
| FeO | 11.97 | FeC2O4•2H2O | 78.90 | 558.97 |
| FeO | 35.92 | Fe3(PO4)2•8H2O | 194.42 | 441.25 |
| Iron(III) Oxide | 30.42 | — | — | — |
| Fe2O3 | 30.42 | Fe2(SO4)3 | 128.99 | 324.08 |
| Fe2O3 | 15.21 | FePO4•2H2O | 65.10 | 328.08 |
| Fe2O3 | 30.42 | MgFe2O4 | 48.76 | 60.31 |
| Fe2O3 | 30.42 | NiFe2O4 | 45.37 | 49.17 |
| Fe2O3 | 30.42 | CuFe2O4 | 44.14 | 45.11 |
| Fe2O3 | 30.42 | MnFe2O4 | 48.45 | 59.27 |
| Fe2O3 | 30.42 | ZnFe2O4 | 46.02 | 51.30 |
| Cobalt(II) oxide | 11.64 | CoCO3 | 28.32 | 143.39 |

TABLE 1-continued

Molar Volume Change Of The Samples That Have A Solid Matrix Comprising A Metal Oxide.

| Matrix | Molar volume of matrix | Product | Molar volume of product | % molar volume change |
|---|---|---|---|---|
| CoO | 11.64 | CoSO4 | 41.78 | 259.06 |
| CoO | 11.64 | CoSO4•7H2O | 138.47 | 1,090.11 |
| CoO | 11.64 | CoSO4•H2O | 56.17 | 382.77 |
| CoO | 11.64 | CoC2O4 | 48.66 | 318.20 |
| CoO | 34.91 | Co3(PO4)2•8H2O | 184.43 | 428.35 |
| Cobalt(II, III) oxide | 39.41 | CoCO3 | 28.32 | −28.14 |
| Co3O4 | 13.14 | CoSO4 | 41.78 | 218.02 |
| Co3O4 | 13.14 | CoSO4•7H2O | 138.47 | 954.09 |
| Co3O4 | 13.14 | CoSO4•H2O | 56.17 | 327.59 |
| Co3O4 | 13.14 | CoC2O4 | 48.66 | 270.41 |
| Co3O4 | 39.41 | Co3(PO4)2•8H2O | 184.43 | 367.97 |
| Cobalt(III) oxide | 16.01 | CoCO3 | 28.32 | 76.89 |
| Co2O3 | 16.01 | CoSO4 | 41.78 | 160.95 |
| Co2O3 | 16.01 | CoSO4•7H2O | 138.47 | 764.92 |
| Co2O3 | 16.01 | CoSO4•H2O | 56.17 | 250.86 |
| Co2O3 | 16.01 | CoC2O4 | 48.66 | 203.93 |
| Co2O3 | 48.03 | Co3(PO4)2•8H2O | 184.43 | 283.98 |
| Nickle(II) Oxide | 11.11 | — | — | — |
| NiO | 11.11 | NiCO3 | 27.05 | 143.33 |
| NiO | 11.11 | NiSO4 | 38.59 | 247.22 |
| Copper(II) Oxide | 12.61 | — | — | — |
| CuO | 12.61 | CuCO3 | 31.68 | 151.34 |
| CuO | 12.61 | CuSO4 | 44.34 | 251.72 |
| CuO | 37.82 | Cu3(PO4)2 | 84.52 | 123.49 |
| Zinc Oxide | 14.54 | — | — | — |
| ZnO | 14.54 | ZnCO3 | 28.29 | 94.59 |
| ZnO | 14.54 | ZnSO4 | 42.49 | 192.33 |
| ZnO | 43.61 | Zn3(PO4)2 | 96.54 | 121.39 |
| Barium Oxide | 26.80 | — | — | — |
| BaO | 26.80 | BaCO3 | 46.04 | 71.77 |
| BaO | 26.80 | BaSO4 | 51.98 | 93.95 |
| BaO | 26.80 | BaC2O4 | 84.78 | 216.34 |
| Aluminum Oxide | 25.55 | — | — | — |
| Al2O3 | 25.55 | Al2(SO4)3 | 128.05 | 401.10 |
| Al2O3 | 12.78 | AlPO4 | 47.64 | 272.84 |
| Al2O3 | 25.55 | MgAl2O4 | 39.09 | 52.95 |
| Al2O3 | 25.55 | MgAl2O4 + CO2 | 39.09 | 52.95 |
| Al2O3 | 25.55 | FeAl2O4 | 44.00 | 72.20 |
| Al2O3 | 25.55 | ZnAl2O4 | 42.64 | 66.86 |
| Al2O3 | 25.55 | BeAl2O4 | 34.79 | 36.13 |
| Al2O3 | 25.55 | CaAl2O4 | 53.03 | 107.53 |
| Al2O3 | 25.55 | CoAl2O4 | 40.48 | 41.31 |

The matrix can also comprise a hydroxide, such as a metal hydroxide. For example, it can comprise magnesium hydroxide (e.g., Mg(OH)$_2$), calcium hydroxide (e.g., Ca(OH)$_2$), strontium hydroxide (e.g., Sr(OH)$_2$), and barium hydroxide (e.g., Ba(OH)$_2$), chromium hydroxide (e.g., Cr(OH)$_2$), titanium hydroxide (e.g., Ti(OH)$_2$), zirconium hydroxide (e.g., Zr(OH)$_4$), manganese hydroxide (e.g., Mn(OH)$_2$), iron hydroxide (e.g., Fe(OH)$_2$), copper hydroxide (e.g., Cu(OH)$_2$), zinc hydroxide (e.g., Zn(OH)$_2$), aluminum hydroxide (e.g., Al(OH)$_3$), or a combination thereof. Some of the examples are provided in Table 2.

The matrix can also comprise a fluoride, such as a metal fluoride. For example, it can comprise magnesium fluoride (e.g., MgF$_2$), calcium fluoride(e.g., CagF$_2$), strontium fluoride (e.g., SrF$_2$), and barium fluoride (e.g., BagF$_2$), chromium fluoride (e.g., CrF$_2$), titanium fluoride (e.g., TiF$_3$), zirconium fluoride (e.g., ZrF$_4$), manganese fluoride (e.g., MnF$_2$), iron fluoride (e.g., FeF$_2$), copper fluoride (e.g., CuF$_2$), nickel fluoride (e.g., NiF$_2$), zinc fluoride (e.g., ZnF$_2$), aluminum fluoride (e.g., AlF$_3$), or a combination thereof. Some of the examples are provided in Table 3.

The matrix can also comprise a mixed metal oxide, such as a metal titanate. For example, it can comprise magnesium titanate (e.g., MgTiO$_3$), calcium titanate (e.g., CaTiO$_3$,), strontium titanate (e.g., SrTiO$_3$), barium titanate (e.g., BaTiO$_3$), or a combination thereof. Some of the examples are provided in Table 4.

The matrix can also comprise a sulfate, such as a metal sulfate. For example, it can comprise magnesium sulfate (e.g., MgSO$_4$), calcium sulfate (e.g., CaSO$_4$), strontium sulfate (e.g., SrSO$_4$), and barium sulfate (e.g., BaSO$_4$), chromium sulfate (e.g., Cr$_2$(SO$_4$)$_3$), titanium sulfate (e.g., TiSO$_4$, Ti$_2$(SO$_4$)$_3$), zirconium sulfate (e.g., ZrSO$_4$), manganese sulfate (e.g., MnSO$_4$), iron sulfate (e.g., FeSO$_4$), copper sulfate (e.g., CuSO$_4$), nickel sulfate (e.g., NiSO$_4$), zinc sulfate (e.g., ZnSO$_4$), aluminum sulfate (e.g., Al$_2$(SO$_4$)$_3$), or a combination thereof. Some of the examples are provided in Table 5.

TABLE 2

Molar Volume Change Of The Samples That Have A Solid Matrix Comprising A Metal Hydroxide.

| Matrix | Molar volume of matrix | Product | Molar volume of product | % molar volume change |
|---|---|---|---|---|
| Beryllium Hydroxide | 22.41 | — | — | — |
| Be(OH)2 | 22.41 | BeSO4 | 42.03 | 87.55 |
| Be(OH)2 | 22.41 | BeSO4•4H2O | 103.59 | 362.24 |
| Magnesium Hydroxide | — | — | — | — |
| Mg(OH)2 | 24.30 | MgCO3 | 27.64 | 13.73 |
| Mg(OH)2 | 24.30 | MgSO4 | 45.25 | 86.19 |
| Mg(OH)2 | 24.30 | MgC2O4—2H2O | 60.56 | 149.16 |
| 3Mg(OH)2 | 72.91 | Mg3(PO4)2—8H2O | 187.55 | 157.22 |
| Calcium Hydroxide | — | — | — | — |
| Ca(OH)2 | 33.51 | CaCO3 | 36.93 | 10.21 |
| Ca(OH)2 | 33.51 | CaSO4 | 45.99 | 37.25 |
| Ca(OH)2 | 33.51 | CaC2O4 | 58.22 | 73.74 |
| 3Ca(OH)2 | 100.53 | Ca3(PO4)2 | 98.78 | −1.74 |
| Strontium Hydroxide | 33.55 | — | — | — |
| Sr(OH)2 | 33.55 | SrCO3 | 42.18 | 25.72 |
| Sr(OH)2 | 33.55 | SrSO4 | 46.38 | 38.25 |
| 3Sr(OH)2 | 100.65 | Sr3(PO4)2 | 129.37 | 28.53 |
| Yttrium hydroxide | 22.41 | — | — | — |
| Y(OH)3 | 44.82 | Y2(SO4)3•8H2O | 234.66 | 423.56 |
| Y(OH)3 | 22.41 | YPO4 | 38.71 | 72.74 |
| Zirconium Hydroxide | — | — | — | — |
| Zr(OH)4 | 49.00 | Zr(SO4)2 | 88.00 | 79.60 |
| Manganese Hydroxide | 27.29 | — | — | — |
| Mn(OH)2 | 27.29 | MnCO3 | 31.07 | 13.86 |
| Mn(OH)2 | 27.29 | MnSO4 | 46.46 | 70.27 |
| Mn(OH)2 | 27.29 | MnC2O4•2H2O | 73.06 | 167.74 |
| Iron(II) Hydroxide | 26.43 | — | — | — |
| Fe(OH)2 | 26.43 | FeCO3 | 29.37 | 11.14 |
| 2Fe(OH)2 | 52.86 | Fe2(SO4)3 | 128.99 | 144.03 |
| Fe(OH)2 | 26.43 | FePO4•2H2O | 65.10 | 146.33 |
| Cobalt(II) hydroxide | 25.82 | — | — | — |
| Co(OH)2 | 25.82 | CoCO3 | 28.32 | 9.69 |
| Co(OH)2 | 25.82 | CoSO4 | 41.78 | 61.81 |
| Co(OH)2 | 25.82 | CoSO4•7H2O | 138.47 | 436.33 |
| Co(OH)2 | 25.82 | CoSO4•H2O | 56.17 | 117.56 |
| Co(OH)2 | 25.82 | CoC2O4 | 48.66 | 88.47 |
| Co(OH)2 | 77.46 | Co3(PO4)2•8H2O | 184.43 | 138.10 |
| Cobalt(III) hydroxide | 27.49 | — | — | — |
| Co(OH)3 | 27.49 | CoCO3 | 28.32 | 3.02 |
| Co(OH)3 | 27.49 | CoSO4 | 41.78 | 51.98 |
| Co(OH)3 | 27.49 | CoSO4•7H2O | 138.47 | 403.75 |
| Co(OH)3 | 27.49 | CoSO4•H2O | 56.17 | 104.35 |
| Co(OH)3 | 27.49 | CoC2O4 | 48.66 | 77.02 |
| Co(OH)3 | 82.47 | Co3(PO4)2•8H2O | 184.43 | 123.64 |
| Nickel(II) Hydroxide | 22.34 | — | — | — |
| Ni(OH)2 | 22.34 | NiCO3 | 27.05 | 21.06 |
| Ni(OH)2 | 22.34 | NiSO4 | 38.59 | 72.75 |
| Copper(II) Hydroxide | 28.95 | — | — | — |
| Cu(OH)2 | 28.95 | CuCO3 | 31.68 | 9.44 |
| Cu(OH)2 | 28.95 | CuSO4 | 44.34 | 53.15 |
| 3Cu(OH)2 | 86.85 | Cu3(PO4)2 | 84.52 | −2.69 |
| Zinc Hydroxide | 32.55 | — | — | — |
| Zn(OH)2 | 32.55 | ZnCO3 | 28.29 | −13.11 |

TABLE 2-continued

Molar Volume Change Of The Samples That Have A Solid Matrix Comprising A Metal Hydroxide.

| Matrix | Molar volume of matrix | Product | Molar volume of product | % molar volume change |
|---|---|---|---|---|
| Zn(OH)2 | 32.55 | ZnSO4 | 42.49 | 30.53 |
| 3Zn(OH)2 | 97.66 | Zn3(PO4)2 | 96.54 | −1.15 |
| Barium Hydroxide | 78.60 | — | — | — |
| Ba(OH)2 | 78.60 | BaCO3 | 46.04 | −41.43 |
| Ba(OH)2 | 78.60 | BaSO4 | 51.98 | −33.86 |
| Ba(OH)2 | 78.60 | BaC2O4 | 84.78 | 7.87 |
| Aluminum Hydroxide | 32.50 | — | — | — |
| 2Al(OH)3 | 65.00 | Al2(SO4)3 | 128.05 | 97.00 |
| Al(OH)3 | 32.50 | AlPO4 | 47.64 | 46.58 |
| Boehmite | 19.54 | — | — | — |
| 2AlO(OH) | 39.08 | MgAl2O4 | 40.07 | 2.54 |
| Diaspore | 17.75 | — | — | — |
| 2AlO(OH) | 35.50 | MgAl2O4 | 40.07 | 12.90 |

TABLE 3

Molar Volume Change Of The Samples That Have A Solid Matrix Comprising A Metal Fluoride.

| Matrix | Molar Volume of Matrix | Product | Molar Volume of Product | % Molar Volume Change |
|---|---|---|---|---|
| Beryllium fluoride | — | — | — | — |
| BeF2 | 22.38 | BeSO4 | 42.03 | 87.79 |
| BeF2 | 22.38 | BeSO4•4H2O | 103.59 | 362.84 |
| Magnesium Fluoride | 19.79 | — | — | — |
| MgF2 | 19.79 | MgCO3 | 27.64 | 39.69 |
| MgF2 | 19.79 | MgSO4 | 45.25 | 128.66 |
| MgF2 | 19.79 | MgC2O4—2H2O | 60.56 | 205.99 |
| 3MgF2 | 59.37 | Mg3(PO4)2—8H2O | 187.55 | 215.90 |
| Calcium Fluoride | 24.55 | — | — | — |
| CaF2 | 24.55 | CaCO3 | 36.93 | 50.43 |
| CaF2 | 24.55 | CaSO4 | 45.99 | 87.33 |
| CaF2 | 24.55 | CaC2O4 | 58.22 | 137.14 |
| 3CaF2 | 73.66 | Ca3(PO4)2 | 98.78 | 34.11 |
| Strontium Fluoride | 29.63 | — | — | — |
| SrF2 | 29.63 | SrCO3 | 42.18 | 42.37 |
| SrF2 | 29.63 | SrSO4 | 46.38 | 56.56 |
| 3SrF2 | 88.88 | Sr3(PO4)2 | 129.37 | 45.55 |
| Yttrium fluoride | 36.48 | — | — | — |
| YF3 | 72.95 | Y2(SO4)3•8H2O | 234.66 | 221.67 |
| Zirconium(IV) Fluoride | 37.75 | — | — | — |
| ZrF4 | 37.75 | Zr(SO4)2 | 88.00 | 133.12 |
| Chromium(II) Fluoride | 23.74 | — | — | — |
| CrF2 | 47.49 | Cr2(SO4)3 | 52.68 | 10.93 |
| CrF2 | 23.74 | CrC2O4•H2O | 64.03 | 169.67 |
| CrF2 | 23.74 | CrPO4 | 31.95 | 34.55 |
| Manganese(II) Fluoride | 23.35 | — | — | — |
| MnF2 | 23.35 | MnCO3 | 31.07 | 33.05 |
| MnF2 | 23.35 | MnSO4 | 46.46 | 98.97 |
| MnF2 | 23.35 | MnC2O4•2H2O | 73.06 | 212.87 |
| Iron(II) fluoride | 22.94 | — | — | — |
| FeF2 | 22.94 | FeCO3 | 29.37 | 28.03 |
| FeF2 | 22.94 | FeSO4 | 41.62 | 81.39 |
| FeF2 | 22.94 | FePO4•2H2O | 65.10 | 183.75 |
| Cobalt(II) fluoride | 21.73 | — | — | — |
| CoF2 | 21.73 | CoCO3 | 28.32 | 30.31 |
| CoF2 | 21.73 | CoSO4 | 41.78 | 92.23 |
| CoF2 | 21.73 | CoSO4•7H2O | 138.47 | 537.15 |
| CoF2 | 21.73 | CoSO4•H2O | 56.17 | 158.46 |
| CoF2 | 21.73 | CoC2O4 | 48.66 | 123.90 |
| CoF2 | 7.24 | Co3(PO4)2•8H2O | 184.43 | 2,445.80 |

TABLE 3-continued

Molar Volume Change Of The Samples That Have A Solid Matrix Comprising A Metal Fluoride.

| Matrix | Molar Volume of Matrix | Product | Molar Volume of Product | % Molar Volume Change |
|---|---|---|---|---|
| Cobalt(III) fluoride | 29.88 | — | — | — |
| CoF3 | 29.88 | CoCO3 | 28.32 | −5.22 |
| CoF3 | 29.88 | CoSO4 | 41.78 | 39.83 |
| CoF3 | 29.88 | CoSO4•7H2O | 138.47 | 363.46 |
| CoF3 | 29.88 | CoSO4•H2O | 56.17 | 88.00 |
| CoF3 | 29.88 | CoC2O4 | 48.66 | 62.86 |
| CoF3 | 89.64 | Co3(PO4)2•8H2O | 184.43 | 105.75 |
| Nickel(II) Fluoride | 20.57 | — | — | — |
| NiF2 | 20.57 | NiCO3 | 27.05 | 31.46 |
| NiF2 | 20.57 | NiSO4 | 38.59 | 87.59 |
| Copper(II) fluoride | 24.01 | — | — | — |
| CuF2 | 24.01 | CuCO3 | 31.68 | 31.97 |
| CuF2 | 24.01 | CuSO4 | 44.34 | 84.69 |
| 3CuF2 | 72.02 | Cu3(PO4)2 | 84.52 | 17.36 |
| Zinc fluoride | 21.10 | — | — | — |
| ZnF2 | 21.10 | ZnCO3 | 28.29 | 34.03 |
| ZnF2 | 21.10 | ZnSO4 | 42.49 | 101.36 |
| 3ZnF2 | 63.31 | Zn3(PO4)2 | 96.54 | 52.49 |
| Barium Fluoride | 35.83 | — | — | — |
| BaF2 | 35.83 | BaCO3 | 46.04 | 28.48 |
| BaF2 | 35.83 | BaSO4 | 51.98 | 45.07 |
| BaF2 | 35.83 | BaC2O4 | 84.78 | 136.61 |
| Aluminum fluoride | 27.09 | — | — | — |
| 2AlF3 | 54.18 | Al2(SO4)3 | 128.05 | 136.35 |
| AlF3 | 27.09 | AlPO4 | 47.64 | 75.85 |

TABLE 4

Molar Volume Change Of The Samples That Have A Solid Matrix Comprising A Mixed Metal Oxide.

| Matrix | Molar Volume of Matrix | Product | Molar Volume of Product | % Molar Volume Change |
|---|---|---|---|---|
| Magnesium metatitanate | 31.21 | — | — | — |
| MgTiO3 | 31.21 | MgCO3 | 27.64 | −11.43 |
| MgTiO3 | 31.21 | MgSO4 | 45.25 | 44.98 |
| MgTiO3 | 31.21 | MgC2O4—2H2O | 60.56 | 94.01 |
| 3MgTiO3 | 93.64 | Mg3(PO4)2—8H2O | 187.55 | 100.29 |
| Calcium titanate | 34.16 | — | — | — |
| CaTiO3 | 34.16 | CaCO3 | 36.93 | 8.13 |
| CaTiO3 | 34.16 | CaSO4 | 45.99 | 34.66 |
| CaTiO3 | 34.16 | CaC2O4 | 58.22 | 70.46 |
| 3CaTiO3 | 102.47 | Ca3(PO4)2 | 98.78 | −3.60 |
| Strontium titanate | 35.98 | — | — | — |
| SrTiO3 | 35.98 | SrCO3 | 42.18 | 17.24 |
| SrTiO3 | 35.98 | SrSO4 | 46.38 | 28.92 |
| 3SrTiO3 | 107.94 | Sr3(PO4)2 | 129.37 | 19.86 |
| Barium Titanate | 38.74 | — | — | — |
| BaTiO3 | 38.74 | BaCO3 | 46.04 | 18.85 |
| BaTiO3 | 38.74 | BaSO4 | 51.98 | 34.19 |
| BaTiO3 | 38.74 | BaC2O4 | 84.78 | 118.87 |
| Manganese(II) titanate | 33.14 | — | — | — |
| MnTiO3 | 33.14 | MnCO3 | 31.07 | −6.27 |
| MnTiO3 | 33.14 | MnSO4 | 46.46 | 40.18 |
| MnTiO3 | 33.14 | MnC2O4•2H2O | 73.06 | 120.42 |
| Iron(II) titanate | 32.14 | — | — | — |
| FeTiO3 | 32.14 | FeCO3 | 29.37 | −8.61 |
| FeTiO3 | 32.14 | FeSO4 | 41.62 | 29.48 |
| FeTiO3 | 32.14 | FePO4•2H2O | 65.10 | 102.55 |
| Nickel(II) titanate | 30.91 | — | — | — |
| NiTiO3 | 30.91 | NiCO3 | 27.05 | −12.51 |
| NiTiO3 | 30.91 | NiSO4 | 38.59 | 24.85 |

TABLE 5

Molar Volume Change Of The Samples That Have A Solid Matrix Comprising A Metal Sulfate.

| Matrix | Molar volume of matrix | Product | Molar volume of product | % molar volume change |
|---|---|---|---|---|
| Magnesium Sulfate | 45.25 | — | — | — |
| MgSO4 | 45.25 | MgCO3 | 27.64 | −38.91 |
| MgSO4 | 45.25 | MgC2O4—2H2O | 60.56 | 33.82 |
| 3MgSO4 | 135.75 | Mg3(PO4)2—8H2O | 187.55 | 38.15 |
| Calcium Sulfate | 45.99 | — | — | — |
| CaSO4 | 45.99 | CaCO3 | 36.93 | −19.70 |
| CaSO4 | 45.99 | CaC2O4 | 58.22 | 26.59 |
| 3CaSO4 | 137.98 | Ca3(PO4)2 | 98.78 | −28.41 |
| Strontium Sulfate | 46.38 | — | — | — |
| SrSO4 | 46.38 | SrCO3 | 42.18 | −9.06 |
| 3SrSO4 | 139.15 | Sr3(PO4)2 | 129.37 | −7.03 |
| Barium Sulfate | 51.98 | — | — | — |
| BaSO4 | 51.98 | BaCO3 | 46.04 | −11.43 |
| BaSO4 | 51.98 | BaC2O4 | 84.78 | 63.10 |
| Chromium(II) Sulfate | 52.68 | — | — | — |
| Cr2(SO4)3 | 52.68 | CrC2O4•H2O | 64.03 | 21.55 |
| Cr2(SO4)3 | 52.68 | CrPO4 | 31.95 | −39.35 |
| Manganese(II) Sulfate | 46.46 | — | — | — |
| MnSO4 | 46.46 | MnCO3 | 31.07 | −33.13 |
| MnSO4 | 46.46 | MnC2O4•2H2O | 73.06 | 57.24 |
| Iron(II) Sulfate | 41.62 | — | — | — |
| FeSO4 | 41.62 | FeCO3 | 29.37 | −29.42 |
| FeSO4 | 41.62 | FePO4•2H2O | 65.10 | 56.43 |
| Nickel(II) Sulfate | 38.59 | — | — | — |
| NiSO4 | 38.59 | NiCO3 | 27.05 | −29.92 |
| Copper(II) Sulfate | 44.34 | — | — | — |
| CuSO4 | 44.34 | CuCO3 | 31.68 | −28.55 |
| 3CuSO4 | 133.01 | Cu3(PO4)2 | 84.52 | −36.46 |
| Zinc Sulfate | 42.49 | — | — | — |
| ZnSO4 | 42.49 | ZnCO3 | 28.29 | −33.43 |
| ZnSO4 | 127.48 | Zn3(PO4)2 | 96.54 | −24.27 |
| Aluminum Sulfate | 128.05 | — | — | — |
| Al2(SO4)3 | 64.03 | AlPO4 | 47.64 | −25.59 |
| Cobalt(II) Sulfate | 41.78 | — | — | — |
| CoSO4 | 41.78 | CoCO3 | 28.32 | −32.21 |
| CoSO4 | 41.78 | CoC2O4 | 48.66 | 16.47 |
| CoSO4 | 125.33 | Co3(PO4)2•8H2O | 184.43 | 47.15 |
| (½)Y2(SO4)3•8H2O | 117.33 | YPO4 | 38.71 | −67.01 |

The matrix can also comprise a silicate, such as a metal silicate. For example, it can comprise lithium metasilicate, lithium orthosilicate, sodium metasilicate, beryllium silicate, calcium silicate, strontium orthosilicate, barium metasilicate, zirconium silicate, manganese metasilicate, iron silicate, cobalt orthsilicate, zinc orthosilicate, cadmium metasilicate, andalusite, silimanite, hyanite, kaolinite, or a combination thereof. Some of the examples are provided in Table 6.

The matrix can also comprise a hydroxyapatite, such as a metal hydroxyapatite. For example, it can comprise calcium carbonate, calcium nitrate tetrahydrate, calcium hydroxide, or a combination thereof. Some examples are provided in Table 7.

The matrix can further comprise an inert fill material, in addition to any of the materials mentioned above and others. An inert fill material can be any material that is incorporated into the solid matrix to fill the pores and do not significantly react with the infiltrant to for chemical bonding. For example, the inert material can be wood, plastic, glass, metal, ceramic, ash, or combinations thereof.

The powder can be characterized by a mean particle size, which can range from about 0.005 μm to 500 μm, such as from about 0.01 μm to about 100 μm, particle size distribution and specific surface area. A fine mean particle size and a narrow particle size distribution can be desirable for enhanced dissolution.

The powder can be formed into a green body of any desired shape and size via any conventional technique, including extrusion, injection molding, die pressing, isostatic pressing, and slip casting. Ceramic thin films can also be formed. Any lubricants, binders of similar materials used in shaping the compact can be used and should have no deleterious effect on the resulting materials. Such materials are preferably of the type which evaporate or burn out on heating at relatively low temperature, preferably below 500° C., leaving no significant amount of residue.

TABLE 6

Molar Volume Change Of The Samples That Have A Solid Matrix Comprising A Silicate.

| Matrix | Molar volume of matrix | Product | Molar volume of product | % molar volume change |
|---|---|---|---|---|
| Lithium Metasilicate | 35.70 | — | — | — |
| 2LiSiO4 | 71.40 | Li2CO3 + 2SiO2 | 89.74 | 25.69 |
| 2LiSiO4 | 71.40 | Li2SO4 + 2SiO2 | 104.47 | 46.31 |
| 2LiSiO4 | 71.40 | Li2SO4•H2O + 2SiO2 | 116.84 | 63.64 |
| 2LiSiO4 | 71.40 | Li2C2O4 + 2SiO2 | 102.77 | 43.93 |
| 3LiSiO4 | 107.10 | Li3PO4 + 3SiO2 | 129.15 | 20.59 |
| Lithium Orthosilicate | — | — | — | — |
| Li2SiO3 | 41.43 | Li2CO3 + SiO2 | 62.38 | 50.56 |
| Li2SiO3 | 41.43 | Li2SO4 + SiO2 | 77.11 | 86.11 |
| Li2SiO3 | 41.43 | Li2SO4•H2O + SiO2 | 89.48 | 115.96 |
| Li2SiO3 | 41.43 | Li2C2O4 + SiO2 | 75.43 | 82.05 |
| (3/2)Li2SiO3 | 62.15 | Li3PO4 + (3/2)SiO2 | 88.11 | 41.77 |
| Sodium Metasilicate | 46.77 | — | — | — |
| Na2SiO3 | 46.77 | Na2CO3 + SiO2 | 69.09 | 47.73 |
| Na2SiO3 | 46.77 | Na2SO4 + SiO2 | 79.97 | 70.99 |
| Na2SiO3 | 46.77 | Na2SO4•10H2O + SiO2 | 248.04 | 430.37 |
| Na2SiO3 | 46.77 | Na2C2O4 + SiO2 | 84.63 | 80.95 |
| (3/2)Na2SiO3 | 70.15 | Na3PO4 + (3/2)SiO2 | 105.58 | 50.51 |
| (3/2)Na2SiO3 | 70.15 | Na3C6H5O7•5H2O + (3/2)SiO2 | 228.22 | 225.32 |
| Beryllium Silicate | 36.95 | — | — | — |
| (1/2)Be2SiO4 | 18.47 | BeSO4 + SiO2 | 55.71 | 201.58 |
| (1/2)Be2SiO4 | 18.47 | BeSO4•4H2O + SiO2 | 117.27 | 534.81 |
| Magnesium Silicate | 43.83 | — | — | — |
| (1/2)Mg2SiO4 | 21.91 | MgCO3 + SiO2 | 41.32 | 88.57 |
| (1/2)Mg2SiO4 | 21.91 | MgSO4 + SiO2 | 58.93 | 168.91 |
| (1/2)Mg2SiO4 | 21.91 | MgC2O4—2H2O + SiO2 | 74.24 | 238.74 |
| (3/2)Mg2SiO4 | 65.74 | Mg3(PO4)2—8H2O + SiO2 | 228.59 | 247.69 |
| Calcium Silicate | 39.78 | — | — | — |
| CaSiO3 | 39.78 | CaCO3 + SiO2 | 64.29 | 61.62 |
| CaSiO3 | 39.78 | CaSO4 + SiO2 | 73.36 | 84.39 |
| CaSiO3 | 39.78 | CaC2O4 + SiO2 | 85.58 | 115.13 |
| 3CaSiO3 | 119.34 | Ca3(PO4)2 + SiO2 | 180.87 | 51.55 |
| Strontium Orthosilicate | 59.40 | — | — | — |
| (1/2)Sr2SiO4 | 29.70 | SrCO3 + SiO2 | 55.86 | 88.07 |
| (1/2)Sr2SiO4 | 29.70 | SrSO4 + SiO2 | 60.06 | 102.22 |
| (3/2)Sr2SiO4 | 89.11 | Sr3(PO4)2 + SiO2 | 170.41 | 91.25 |
| Barium Metasilicate | 48.50 | — | — | — |
| BaSiO3 | 48.50 | BaCO3 + SiO2 | 73.40 | 51.33 |
| BaSiO3 | 48.50 | BaSO4 + SiO2 | 79.34 | 63.58 |
| BaSiO3 | 48.50 | BaC2O4 + SiO2 | 112.14 | 131.21 |
| Zirconium Silicate | 39.42 | — | — | — |
| ZrSiO4 | 39.42 | Zr(SO4)2 + SiO2 | 115.36 | 192.63 |
| Manganese(II) metasilicate | 37.65 | — | — | — |
| MnSiO3 | 37.65 | MnCO3 + SiO2 | 58.43 | 55.19 |
| MnSiO3 | 37.65 | MnSO4 | 73.82 | 96.08 |
| MnSiO3 | 37.65 | MnSO4•H2O | 84.65 | 124.85 |
| MnSiO3 | 37.65 | MnSO4•4H2O | 126.06 | 234.82 |
| MnSiO3 | 37.65 | MnC2O4•2H2O | 100.42 | 166.71 |
| 2MnSiO3 | 75.30 | Mn2P2O7 | 131.22 | 74.27 |
| Iron(II) Silicate | 47.39 | — | — | — |
| (1/2)Fe2SiO4 | 94.78 | FeCO3 + SiO2 | 84.10 | −11.27 |
| (1/2)Fe2SiO4 | 94.78 | FeSO4 + SiO2 | 96.34 | 1.65 |
| (1/2)Fe2SiO4 | 94.78 | FeC2O4•2H2O + SiO2 | 133.62 | 40.99 |
| (3/2)Fe2SiO4 | 31.59 | Fe3(PO4)2•8H2O + SiO2 | 212.66 | 573.12 |
| Cobalt(II) Orthosilicate | 45.35 | — | — | — |
| (1/2)Co2SiO4 | 22.67 | CoCO3 + SiO2 | 42.00 | 85.24 |
| (1/2)Co2SiO4 | 22.67 | CoSO4 + SiO2 | 55.46 | 144.60 |

TABLE 6-continued

Molar Volume Change Of The Samples That Have A Solid Matrix Comprising A Silicate.

| Matrix | Molar volume of matrix | Product | Molar volume of product | % molar volume change |
|---|---|---|---|---|
| (½)Co2SiO4 | 22.67 | CoSO4•7H2O + SiO2 | 152.15 | 571.09 |
| (½)Co2SiO4 | 22.67 | CoSO4•H2O + SiO2 | 69.85 | 208.09 |
| (½)Co2SiO4 | 22.67 | CoC2O4 + SiO2 | 62.34 | 174.96 |
| (3/2)Co2SiO4 | 68.02 | Co3(PO4)2•8H2O + SiO2 | 225.47 | 231.48 |
| Zinc Orthosilicate | 54.37 | — | — | — |
| (½)Zn2SiO4 | 27.18 | ZnCO3 + (½)SiO2 | 41.97 | 54.38 |
| (½)Zn2SiO4 | 27.18 | ZnSO4 + (½)SiO2 | 56.17 | 106.65 |
| (3/2)Zn2SiO4 | 81.55 | Zn3(PO4)2 + (3/2)SiO2 | 137.58 | 68.71 |
| Cadmium Metasilicate | 36.96 | — | — | — |
| CdSiO3 | 36.96 | CdCO3 + SiO2 | 61.67 | 66.85 |
| CdSiO3 | 36.96 | CdSO4 | 71.81 | 94.30 |
| CdSiO3 | 36.96 | CdSO4•H2O | 87.12 | 135.72 |
| CdSiO3 | 36.96 | CdSO4•8H2O | 141.84 | 283.77 |
| CdSiO3 | 36.96 | CdC2O4 | 87.73 | 137.37 |
| Andalusite | 51.52 | — | — | — |
| Al2SiO5 | 51.52 | Al2(SO4)3•16H2O + SiO2 | 251.21 | 387.56 |
| Al2SiO5 | 51.52 | Al2(SO4)3•18H2O + SiO2 | 421.70 | 718.43 |
| (½)Al2SiO5 | 25.76 | AlPO4 + SiO2 | 61.32 | 138.01 |
| Sillimanite | 49.86 | — | — | — |
| Al2SiO5 | 49.86 | Al2(SO4)3•16H2O + SiO2 | 251.21 | 403.83 |
| Al2SiO5 | 49.86 | Al2(SO4)3•18H2O + SiO2 | 421.70 | 745.75 |
| (½)Al2SiO5 | 24.93 | AlPO4 + SiO2 | 61.32 | 145.96 |
| Kyanite | 51.52 | — | — | — |
| Al2SiO5 | 51.52 | Al2(SO4)3•16H2O + SiO2 | 251.21 | 387.56 |
| Al2SiO5 | 51.52 | Al2(SO4)3•18H2O + SiO2 | 421.70 | 718.43 |
| (½)Al2SiO5 | 25.76 | AlPO4 + SiO2 | 61.32 | 138.01 |
| Kaolinite | 99.68 | — | — | — |
| Al2O3•2SiO2•2H2O | 99.68 | Al2(SO4)3•16H2O + 2SiO2 | 237.53 | 138.31 |
| Al2O3•2SiO2•2H2O | 99.68 | Al2(SO4)3•18H2O + 2SiO2 | 408.02 | 309.34 |
| Al2O3•2SiO2•2H2O | 49.84 | AlPO4 + SiO2 | 75.00 | 50.49 |

TABLE 7

Molar Volume Change Of The Samples That Have A Solid Matrix Comprising A Hydroxyapatite.

| Matrix | Molar volume of matrix | Product | Molar volume of product | % molar volume change |
|---|---|---|---|---|
| Calcium Carbonate | 36.93 | — | — | — |
| 5CaCO3 | 184.66 | Ca5(PO4)3(OH) | 159.21 | −13.78 |
| Calcium nitrate tetrahydrate | 129.75 | — | — | — |
| 5Ca(NO3)2•4H2O | 648.76 | Ca5(PO4)3(OH) | 159.21 | −75.46 |
| Calcium Hydroxide | 33.68 | — | — | — |
| 5Ca(OH)2 | 168.39 | Ca5(PO4)3(OH) | 159.21 | −5.45 |

The pores in the starting powder compact can be small, for example, between about 0.01 micrometers (μm) and about 100 μm, such as between about 0.1 μm and about 1 μm, and uniformly distributed throughout the compact, thereby enabling the infiltrant solution to penetrate fully the powder compact. The pore volume content, both closed and open porosity, and the pore size can be determined by standard methods. For example, a mercury intrusion pore sizer can be used to evaluate these three parameters.

The preform obtained above can then be subjected to the steps as discussed below.

Preparation of the Infiltrating Medium

As described previously, hydrothermal sintering can make use of aqueous or nonaqueous media. The choice of liquid solvent can depend on the infiltrant species that may be a part of the infiltrating medium. The infiltrant species can have a substantial solubility in the liquid solvent under the conditions of the hydrothermal sintering process. For example, if the infiltrant species are ionic, then a liquid solvent can be water. Certain nonionic infiltrants may also possess sufficient solubility in aqueous media.

In addition, water-soluble organic solvents, such as alcohols (e.g., methanol, ethanol, propanol, isopropanol and the like), polyols (e.g., ethandiol, 1,2-propanediol, 1,3-propanediol and the like), certain low molecular weight ethers (e.g., furan, tetrahydrofuran), amines (e.g., methylamine, ethylamine, pyridine and the like), low molecular weight ketones (e.g., acetone), sulfoxides (e.g., dimethylsulfoxide), acetonitrile and the like, may also be present in the aqueous mixture. In certain instances, surfactants (e.g., polysiloxanes, polyethylene glycols, and alkyldimethylamine oxides and the like) may be added to the aqueous mixture.

The infiltrating medium preferably contains water-soluble metal salts (i.e., metal in ioniv forms). The cation of such salts, for example, may come from the following metals: berylium, magnesium, calcium, strontium, barium, scandium, titanium, vanadium, chromium, manganese, iron, cobalt, nickel, copper zinc, aluminum, gallium, germanium, tin, antimony, indum, cadium, silver, lead, rhodium, ruthenium, technetium, molybdenum, neodymium, zironium, ytterbium, lanthanum hafnium, tantalum, tungsten, rhenium, osmium, iridium, platinum, gold, mercury, thallium, palladium, cations of the lanthanid series metals, cations of the actinide series metals, and or a mixture thereof. In general, the anion of the salts dissolved in the infiltrating solution may come, for example, from the following groups: hydroxides, nitrates, chlorides, acetates, formates, propionates, phenylacetates, benzoates, hydroxybenzoates, aminobenzoates, methoxybenzoates, nitrobenzoates, sulfates, fluorides, bromides, iodides, carbonates, oxalate, phosphate, citrate, and silicates, or mixtures thereof. The molar ratio of the metal ions contained in the infiltrant to the metal ion of the oxide powder can be selected to achieve a desired stoichiometric reaction product. Excess metal ions in solution may be needed to help achieve completion of the reaction.

Depending on the infiltrating medium and the matrix material, the resultant sintered product can be, for example, a titanate, if a material comprising titanium is involved. For example, titanates having an ilmenite structure can be obtained from $TiO_2$ and salts of $Fe^{2+}$, $Mg^{2+}$, $Mn^{2+}$, $Co^{2+}$, $Ni^{2+}$, or a combination thereof, in water. Titanates having the perovskite structure can be prepared from aqueous salt solutions of $Ca^{2+}$, $Sr^{2+}$, $Ba^{2+}$, or a combination thereof. Moreover, compounds having a spinel structure can be obtained including, $Mg_2TiO_4$, $Zn_2TiO_4$, and $CO_2TiO_4$. Furthermore, in one embodiment, different phases of barium titanate, such as that having the formula $Ba_xTi_yO_{x+2y}$, in which x and y are integers, can be obtained by the method of the present invention, so long as $x \neq 1$, $y \neq 1$, and $x+2y \neq 3$.

Alternatively, the resultant sintered product can be a carbonate, sulfate, oxalate, or a combination thereof; materials that can be used can include a material that may decompose before it is able to sinter if a conventional sintering method is used; for example a carbonate will decompose into its oxide when heated before it is able to sinter in a conventional sintering method.

General HLPS Method for Producing Sintered Ceramic

HLPS Reaction Apparatus

In one embodiment, a "green" or partially sintered porous solid matrix is transformed into a sintered ceramic by HLPS by the action of a liquid phase infiltrating medium. To carry out the infiltration step, the partially sintered porous solid matrix can be immersed in the infiltrant solution. The partially sintered porous solid matrix can rest on a Teflon® mesh support so that it is exposed to infiltrating medium on all surfaces. The infiltration can occur inside a teflon reaction chamber, sealed to control hydrothermal reaction conditions. Also, the teflon reaction chamber can be located inside an autoclave. Whereas the initial pH of the infiltrating medium is set by the reactants, the reaction temperature and pressure can be controlled as desired, by using the temperature and pressure provided by the autoclave. In one embodiment, the temperature and pressure during the hydrothermal reaction process can be less than 250° C. and 5 atmospheres, respectively.

HLPS Reaction

The HLPS process can involve a variety of chemical reactions. For example, the hydrothermal reaction process can occur via a dissolution-re-precipitation reaction mechanism. Alternatively, the reaction can occur via an ion-substitution reaction. In the former, small portions of the compacted porous solid matrix can dissolve furnishing dissolved species which can react with the ions in the infiltrant solution; the ions in the infiltrant solution can be metal ions. In one embodiment, the amount of the infiltrant added can be enough to produce the complete reaction in a single step. Alternatively, multiple steps can be involved. For example, multiple infiltration can be involved. In one embodiment, strontium titanate can be formed from a titania matrix, thereafter by another infiltration it can form strontium apatite. Alternatively, via multiple infiltrations, a carbonate can be formed, which can then form a protective oxalate layer. In another embodiment, the compact can be partially infiltrated and dried, and the infiltration step can be repeated until the final product is produced.

The shape of the monolithic body produced can be retained from that of the solid matrix. In one embodiment, when the molar volume of the reaction product formed within the porosity of the matrix is greater than that of the oxide powder (i.e., a positive molar volume change—i.e., transformation to a larger molar volume), the nucleated product fills the voids of the compact and increases its density. The molar volume change need not be positive; it can also be negative (i.e., transformation to a smaller molar volume) or no change depending on the ion species and reaction mechanism. For example, a portion of the matrix can dissolve away during the reaction, increasing porosity while creating new chemical bonding and a negative molar volume change. Similarly, if the new material formed has the same molar volume as that from the loss of the matrix, then there is substantially no molar volume change.

HLPS reaction can occur via, for example, ion addition and/or ion substitution. Addition reactions are where ions (anions or cations) in the infiltrating medium can be added to the matrix host without substituting another ion in the matrix. Examples of an ion addition can include transformation from oxide to hydroxide, or from oxide to carbonate. Examples of an ion substitution can include transformation from hydroxide to carbonate, or hydroxide to oxalate. Additionally, the reaction can occur via disproportionation, wherein the insoluble inorganic host/matrix material can be split into two insoluble inorganic products. Disproportionation can be performed, for example, for oxides, fluorides, and sulfates. The general reactions can be described as follows:

Note that salts of A, A', C are all soluble in the solvent of choice (water or some other solvent mixture). AOH, $A(OH)_2$ and COH are strong bases. C can be monovalent organic (NR4+) or inorganic cation (NH4+, K+, Na+ and Li+). X is a soluble ion like nitrate or chloride. A can be a mixture of divalent alkaline earth ions such as Mg2+, Ca2+, Sr2+ or Ba2+, or monovalent ions Li+, Na+, K+, NH4+ or NR4+. A' can be a divalent cation that is neither an alkaline earth nor an alkali, such as lead. B is a transition metal, rare earth, actinide or main group metal ion that has a +2, +3, +4 or +5 valence. The B metal comprises a host sparingly soluble in the infiltration medium, which B can include a range of chemistries. For example, B can be an oxide or a hydrous oxide, but B could also be other compounds such as a metal sulfate or a phosphate. Unless designated otherwise, all species are soluble and all insoluble compounds have an (s) designation.

Addition Reactions

Oxide Products

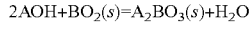

$2AOH + BO_2(s) = A_2BO_3(s) + H_2O$

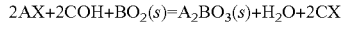

$2AX + 2COH + BO_2(s) = A_2BO_3(s) + H_2O + 2CX$ $A(OH)2+BO2(s)=ABO3(s)+H2O$ $A(OH)2+B2O3(s)=AB2O4(s)+H2O$ $AX2+2COH+BO2(s)=ABO3(s)+H2O+2CX$ $AX2+2COH+B2O3(s)=AB2O4(s)+H2O+2CX$ $2AOH+B2O5(s)=2ABO3(s)+H2O$ $A(OH)2+3B'(OH)2(s)+B2O5(s)=3[B'(A\frac{1}{3}B\frac{2}{3})O3](s)+4H2O$ (matrix comprises two insoluble hosts)

$AX2+3B'X2+8COH+B2O5(s)=3[B'(A\frac{1}{3}B\frac{2}{3})O3](s)+8CX+4H2O$

Substitution Reactions
Carbonates $A2CO3+BSO4(s)=BCO3(s)+A2SO4$ $A2CO3+B(OH)2(s)=BCO3(s)+2AOH$ $B(OH)2(s)+CO2=BCO3(s)+H2O$ Oxalates $A2C2O4+B(OH)2(s)=BC2O4(s)+2AOH$ $A2C2O4+BSO4(s)=BC2O4(s)+A2SO4$ $A2C2O4+BO(s)=BC2O4(s)+A2O$ $A2SO4+B(OH)2(s)=BSO4(s)+2AOH$ $A2SO4+BCO3(s)=BSO4(s)+A2CO3$ Fluorides $2CF+H2O+BO(s)=BF2(s)+2COH$ $6CF+3H2O+B2O3(s)=2BF3(s)+6COH$ $2CF+B(OH)2(s)=BF2(s)+2COH$ $3CF+B(OH)3(s)=BF3(s)+3COH$ Disproportionation Reactions $C2CO3+H2O+BB'O3(s)=BCO3(s)+B'O2+2COH$ $CO2+BB'O3(s)=BCO3(s)+B'O2(s)$ Spinel $A(OH)2+B2O3=BA2O4+H2O$ $AO+B2O3=BA2O4$ $ACO3+B2O3=BA2O4+CO2$ $ASO4+B2O3+H2O=BA2O4+H2SO4$ $A(C2O4)+B2O3+H2O=BA2O4+H2C2O4$ Hybrid Reactions—Addition and Substitution
Phosphates $3C3PO4+5B(OH)_2(s)=B5(PO4)_3OH(s)+9COH$ $3C3PO4+5H2O+5BO(s)=B5(PO4)3OH(s)+9COH$ Fluorophosphates $3C3PO4+5BF2(s)=B5(PO4)_3F(s)+9CF$ Heterogeneous nucleation can also take place during the reaction. As described previously, the change in density can depend on the type of the matrix material and/or that of the product formed. Once the hydrothermal reaction is complete, the open pores can be further removed by, for example, aging.

The temperature set for the hydrothermal process may be of a simple or complex schedule. For example, the heating cycle can be isothermal, but two different sets of temperatures can be used. For example, first a relatively high temperature such as about 250° C. can be used to enhance homogeneous nucleation and subsequently the densified material can be aged at a lower temperature, for example, at about 90° C.

After the reactions as described above are completed, the densified matrix may be rinsed or bathed in a solution to wash away excess infiltrating solution. The rinsing solution can be pH 5 ammonium acetate. In one embodiment, the densified matrix may be subsequently dried in an oven at a temperature of about 90° C. to about 250° C. The residual porosity that may be present in the sintered ceramic can be further removed by heating to a higher temperature, such as about 600° C. or less.

The ceramic product sintered by the HLPS process can have a variety of applications. For example, it can be used a structural (e.g., cement), chemical (e.g., catalyst, filtration), electrical material, or a combination thereof.

Characterization of the Sintered Material
Porosity of Sintered Material

HLPS can produce a sintered product with a very homogeneous and very fine microstructure. The porosity of the sintered material can be, for example, less than about 40 percent, such as less than about 30 percent, such as less than about 20 percent, such as less than about 15 percent, such as less than about 10 percent, such as than about 5 percent, or even practically fully dense. The total porosity of the compact can be determined in a standard technique, for example, with a mercury pore sizer. Density can be estimated using a conventional technique such as Archimede's method or a mercury intrusion pore sizer analyzer.

Size and Shape of Sintered Material

One characteristic of the sintered material undergoing the HLPS process is that it can have the same shape, or even size, as the starting green compact. In one embodiment wherein the product undergoes substantially no molar volume change, no shrinkage of the compact can result, which is in contrast to many ceramic manufacturing processes, and thus little or no machining of the sintered material is needed.

Composition of Sintered Material

As illustrated in the Examples, a broad range of chemical compositions can be used to make the sintered material. Furthermore, the number of different metal oxides and salts involved in the formation of the sintered material need not be restricted in any particular way. In addition, the stoichiometry of the final product can be dictated by the molar ratios of reactants present in the green compact and infiltrating medium. The composition of the sintered material can be evaluated using Quantitative X Ray Diffraction (QXRD) and Inductively Coupled Plasma (ICP).

Microstructure and Related Mechanical Properties

The sintered product of the HLPS process can have a microstructure that substantially resembles a net-like interconnecting network. The monoliths obtained from the HLPS process can also exhibit composite structures such as a core-shell structure. In addition, the product can have superior mechanical properties, such as high tensile strength, compressive strength, and desirable tensile modulus. This initial strengthening can arise from the chemical bonding formed during the process between the physically bonded (van der Waals forces) particles by ion substitution, ion addition, Ostwald ripening (i.e., recrystallization that can form new network), or combinations thereof. In one embodiment, Ostwald ripening can involve aging a carbonate material in an alkaline medium. Furthermore, in the case where there is a positive molar volume change, densification can be achieved, as described previously.

NON-LIMITING WORKING EXAMPLES

Example 1

Formation of Sintered Barium Titanate ($BaTiO_3$) Ceramic Material

Preparation of Green Compacts

Compacts (1 inch diameter, 2-3 mm in width) of titania anatase (TiO2) were formed in a circular die press at pressures of about 100 MPa; Accordingly, 50% dense titania compacts were obtained. The "green" compacts were then fired at P temperature below 500° C. to burn out the binder used in the preforming steps.

The green compacts weighed about 2.5 g after firing.

Hydrothermal Liquid Phase Sintering of Compacts

The green compacts were infiltrated in 41.2 mL of a 1 molar solution of barium hydroxide Ba(OH)2.8H2O at various reaction times, ranging from 1 hour to 194 hours at a temperature of 90° C. The degree of filling in the autoclave was about of 75-80%, and involved water vapor pressures of about 2 atm. The process was carried out in an excess of barium ions, so that the molar ratio of barium to titanium (Ba:Ti) was about 1.2:1. The sintered compact was then filtered, rinsed, and dried.

Characterization of the Densified Ceramic

Quantitative X-ray analysis using the Matrix Flushing Method (Chung, F. H. Appl. Cryst., 1974, 7, 579) with 15% ZrSiO4 standard and inductively coupled plasma were performed on the samples. The results are plotted schematically in FIG. 1.

Figure 2:
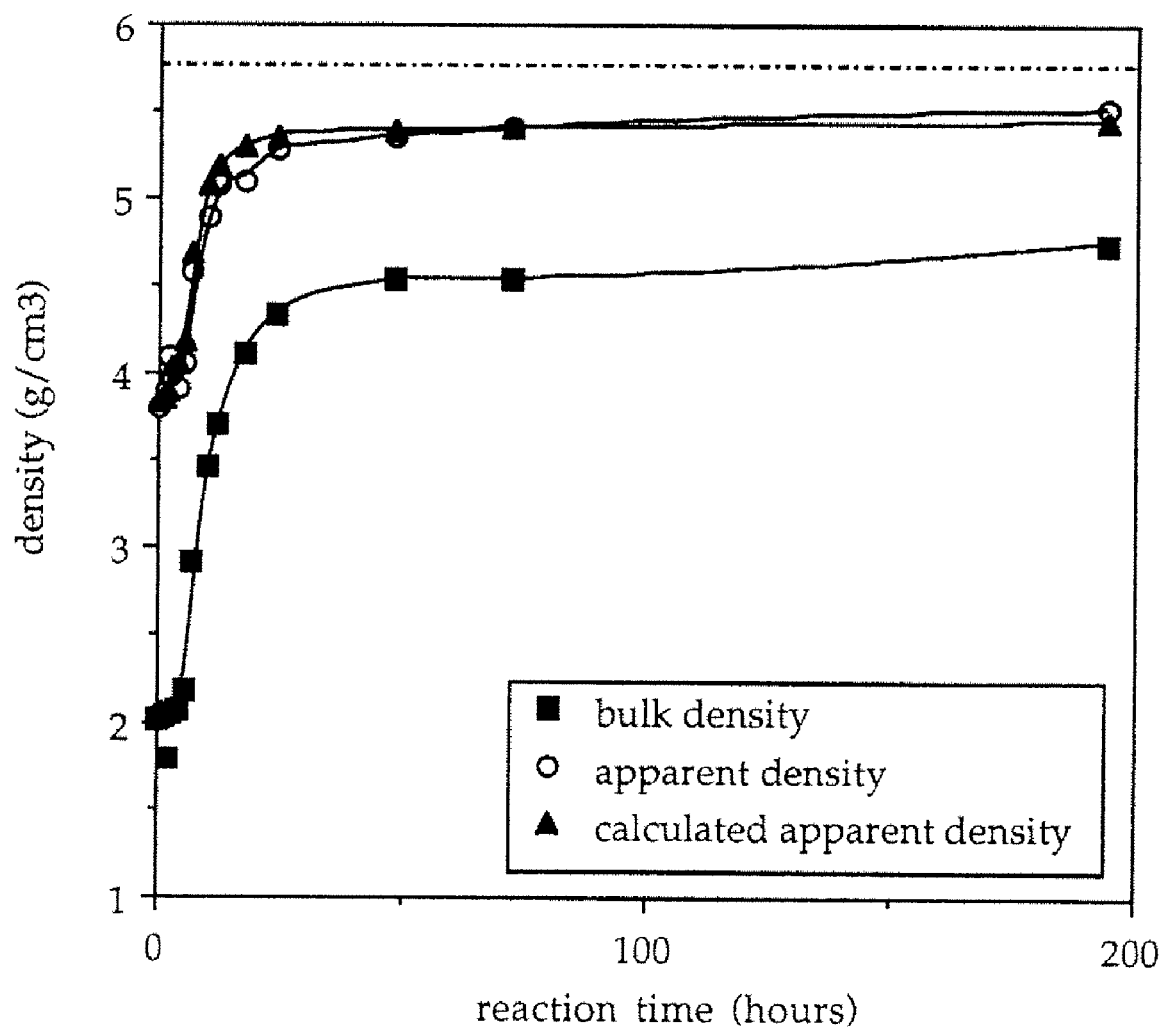
FIG. 2 shows a typical graph of the bulk and apparent densities measured for the compacts prior to infiltration and after the reaction proceeded from 1 hour to 72 hours at a reaction temperature of 90° C. in one embodiment.
Figure 3:
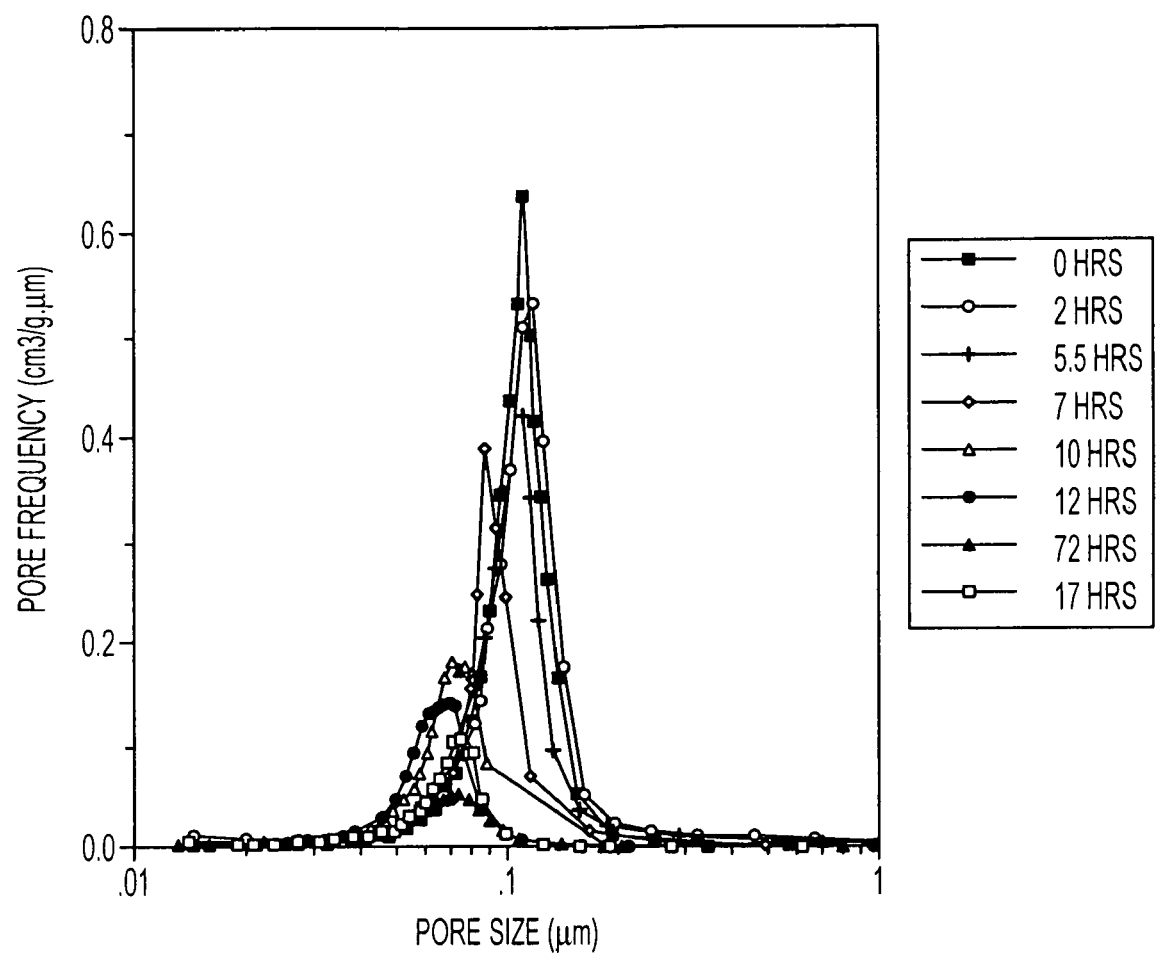
FIG. 3 illustrates a graph of the pore size and cumulative pore volume present in a variety of compacts examined at various infiltration times in one embodiment.

The densities are measured using a mercury pore sizer for both apparent and bulk densities, as shown in FIG. 2. After a reaction time of 72 hours, the compact was 85% of theoretical density. FIG. 3 represents the evolution of the cumulative pore size distribution with reaction time. The results demonstrate that densification of the green compacts took place as a result of the HLPS process, and the sintering process occurred uniformly throughout the sample (i.e., the residual porosity remains continuous).

Example 2

Formation of Sintered Strontium Titanate ($SrTiO_3$)

Two compacts, weighing a combined 7.402 g, were obtained by the procedure similar to that described in Example 1 by dry pressing titanium dioxide powder. Next, an aqueous solution of $Sr(OH)_2.8H_2O$ (27.00 g) in distilled deionized (DI) water (53.01 g) was prepared. The compacts were then placed in a Telfon® net and immersed in a 90 mL Telfon® vessel containing the strontium hydroxide solution. The vessel was sealed and placed in a preheated (105° C.) oven for 24 hours. Subsequently, the compacts were rinsed in 50 mL of an aqueous ammonium acetate buffer (pH about 5.0) for 10 minutes and filtered under vacuum. The sintered compacts were then dried at 100° C. in an electric oven overnight.

Example 3

Formation of Sintered Barium Strontium Titanate ($Ba_{0.5}Sr_{0.5}TiO_3$)

Two titanium dioxide compacts, weighing a combined 7.565 g, were placed in a Teflon® net and immersed into a 90 mL Telfon® vessel containing a basic solution prepared by dissolving $Sr(OH)_2.8H_2O$ (13.975 g) and $Ba(OH)_2.8H_2O$ (16.612 g) in DI water (59.430 g). The sealed vessel was then placed in a preheated (105° C.) oven and kept there for 26 hours. Thereafter, the compacts were rinsed in 50 mL of ammonium acetate buffer (pH about 5.0) for 10 minutes and filtered. The product compacts were then dried at 100° C. in an electric oven overnight.

Example 4

Formation of Sintered Barium Zirconium Titanate ($BaZr_{0.1}Ti_{0.9}O_3$)

Sintered compacts of barium zirconium titanate were obtained by a procedure similar to that described in Example 3, except that the two titanium oxide compacts weighed 6.230 g, and the basic infiltrant solution was prepared from 30.105 g of $Ba(OH)_2.8H_2O$, 3.005 g of $ZrO(NO_3)_2$ and 48.75 g of DI water.

Example 5

Formation of Sintered Barium Calcium Titanate Zirconium Trioxide ($Ba_{0.87}Ca_{0.13}Ti_{0.88}Zr_{0.12}O_3$)

Two titanium oxide compacts, together weighing 7.910 g, were obtained as described in Example 3 and immersed in a basic solution prepared from 33.985 g of Ba(OH)2.8H2O, 1.200 g of Ca(OH)2, 4.694 g of ZrO(NO3)2 and 25.200 g of DI water. The sealed vessel containing the compacts and infiltrant solution was placed in a preheated (115° C.) oven for a period of 30 hours. After this time, the compacts were isolated, rinsed in 50 mL ammonium acetate buffer (pH about 5.0) and filtered under vacuum. These sintered compacts were then dried at 100° C. in an electric oven overnight.

Example 6

Formation of Sintered Ferroelectric Ceramic Materials

Preparation of $Pb(Zr,Ti)O_3$ 2.5 g of $TiO_2$ powder were compressed into a compact according to the procedure described previously. An aqueous 1 M solution of lead chloride (68.9 mL with the pH adjusted to about 12 with sodium hydroxide) was combined with an aqueous 1 M solution of zirconium oxychloride (31.3 mL). The combined solution was placed, along with the $TiO_2$ compact (Pb:Zr:Ti molar ratio is about 1.1:0.5:0.5), in a 60 mL Teflon® vessel.

Afterwards, the sintered compact was removed, rinsed in an ammonium acetate buffer for about 10 minutes, filtered, and subsequently dried in vacuo at room temperature.

Preparation of $BaSnO_3$ 5.0 g of SnO2 powder were compressed into two compacts of approximately equal weight according to the procedure described previously. An aqueous 1 M solution of barium hydroxide (36.5 mL) was placed, along with the SnO2 compacts (Ba:Sn molar ratio was about 1.1:1.0), in a 60 mL Teflon® vessel.

Afterwards, the sintered compacts were removed, rinsed in an ammonium acetate buffer for about 10 minutes, filtered, and subsequently dried in vacuo at room temperature.

Sintered strontium tin oxide (SrSnO3) compacts can also be prepared in this manner.

Example 7

Formation of Sintered Ceramic Materials Having Magnetic Properties ($CoFe_2O_4$)

According to the procedure described previously, 5.0 g of Co2O3 powder were compressed into two compacts of approximately equal weight. An aqueous 1 M solution of iron (II) sulfate (33.2 mL, the pH was adjusted to about 12 with sodium hydroxide) was placed, along with the Co2O3 compacts (Fe:Co molar ration was about 2.2:1.0), in a 60 mL Teflon® vessel.

Afterwards, the sintered compacts were removed, rinsed in an ammonium acetate buffer for about 10 minutes, filtered, and subsequently dried in vacuo at room temperature.

The procedure can be conducted similarly with other divalent ions such as, but not limited to, Ba2+, Sr2+, Ca2+, Pb2+, and Mn2+.

Example 8

Formation of Sintered Ceramic Materials Having Catalytic Properties

Preparation of $NiMoO_4$

According to the procedure described previously, 5.0 g of NiO powder were compressed into two compacts of approximately equal weight. An aqueous 1 M solution of ammonium molybdate (VI), (NH4)2MoO4, (73.6 mL, the pH of the solution was about 6) was placed, along with the NiO compacts (Mo:Ni molar ratio was about 1.1:1.0), in a 60 mL Teflon® vessel.

Afterwards, the sintered compacts were removed, rinsed in an ammonium acetate buffer for about 10 minutes, filtered and subsequently dried in vacuo at room temperature.

This procedure can be modified to provide other mixed divalent metal molybdenum oxides, such as those of strontium and calcium.

Preparation of $SrCrO_4$

According to the procedure described previously, 5.0 g of SrO powder were compressed into two compacts of approximately equal weight. An aqueous 1 M solution of dichromate (26.5 mL), prepared by combining 7.8 g of K2Cr2O7 in concentrated sulfuric acid was placed, along with the SrO compacts (Cr:Sr molar ratio is about 1.1:1.0), in a 60 mL Teflon® vessel.

Afterwards, the sintered compacts were removed, rinsed in an ammonium acetate buffer for about 10 minutes, filtered and subsequently dried in vacuo at room temperature.

Other divalent ions can also be employed in place of strontium. For example, compounds containing barium, calcium, magnesium or zinc can also be prepared.

Example 9

Formation of Sintered Ceramic Materials Having Biological Applications

Sintered ceramic materials having biological applications can also be prepared by the instant method. For instance, prosthetic components can be molded from metal oxide powders and subsequently sintered to provide bone replacement parts suitable for use in orthopedic surgery.

Preparation of $Ca_{10}(OH)_2(PO_4)_6$

According to the procedure described previously, 5.0 g of CaO powder were compressed into two compacts of approximately equal weight. An aqueous 1 M solution of dicalcium pyrophosphate, Ca2P2O7, (73.6 mL) was placed, along with the CaO compacts (total Ca:P molar ratio was about 1.6:1.0), in a 60 mL Teflon® vessel.

Afterwards, the sintered compacts were removed, rinsed in an ammonium acetate buffer for about 10 minutes, filtered and subsequently dried in vacuo at room temperature.

Preparation of Fluoroapatite

CaF2 (0.4 g) powder was mixed with 2.5 vol % PVA binder by means of ultrasonication. It was then freeze dried and dry pressed into a pellet in a ~0.3 inches die with a pressure of ~300 MPa. The sample was annealed at 400° C. for 3 h in box furnace under ambient atmosphere. Teflon jar was filled with 100 ml of de-ionized water and 1 g of K3PO4 and 50 g of KOH were added. The cap of the car was closed and let to cool down to room temperature. CaF2 pellet was placed on a Teflon tray and immersed into the Teflon jar. The cap of the jar was closed and placed in a pre-heated oven at 95° C. It was kept for 7 days. The sample was rinsed with de-ionized water.

Preparation of strontium apatite coated strontium titanate

TiO2 powder (Fisher), 12 g, was dispersed in 140 ml of de-ionized water with the addition of 1% PVA. The mixture was sonicated for 30 minutes. The mixture was shell frozen at −40° C. and then freeze dried. It was then pressed into a 1 inch pellet by using a hydraulic press with a load of 20000 lbs. The green body is then calcined at 550° C. overnight in a furnace to remove the binder.

Strontium hydroxide solution was prepared by dissolving 14 g of Sr(OH)2 in 100 ml of de-ionized water. The pellet was placed in the solution and reacted for 5 days at 90° C. The pellet was removed and washed with de-ionized water. It was then placed in another solution containing 100 ml de-ionized water and 10 g of K3PO4 for 7 days Other procedures can be apparent to those of ordinary skill in the art, in view of the disclosures presented above, which may differ from those that have been described specifically in the foregoing examples but which, nevertheless, do not depart from the scope and spirit of the present invention. The examples presented above serve merely to illustrate particular embodiments of the present invention, and, hence, the subject matter included therein or omitted therefrom should not be construed as limiting the invention in any way. These other apparent procedures, as well as the sintered materials obtained therefrom, are considered to fall within the scope of the present invention, whose limitations are defined solely by the claims that follow immediately.

Example 10

Volume Change as a Result of the HLPS Process

Tables 1-7 provide the molar volume change of the samples that have a solid matrix comprising a oxide, hydroxide, fluoride, mixed metal oxide, sulfate, silicate, and hydroxyapatite, respectively. As is shown in the Figures, the molar volume change need not be either positive or negative.

Additional Preferred Embodiments

In a preferred embodiment of the invention, a method (and the resulting product) is described for the production of a sintered ceramic from a porous solid matrix, the method comprising: (a) contacting a solid matrix having contiguous interstitial pores with a preselected infiltrating medium, (b) allowing the medium to infiltrate the interstitial pores of the matrix under conditions effective to cause the dissolution of mass from the matrix; (c) allowing the medium to transport the dissolved mass under conditions effective to cause the re-precipitation of the transported mass within the matrix, such that a sintered ceramic is obtained. In particular, the preselected infiltrating medium is preferably comprised of preselected infiltrant species mixed with a suitable liquid. More preferably the method further includes a step of allowing mass derived from the matrix to combine with the infiltrant species of the medium to provide a product that re-precipitates within the matrix.

In a preferred embodiment the method produces a product, which is a compound that results from a stoichiometric reaction between the mass derived from the matrix and the infiltrant species: [Amatrix+Binfiltrant=AB].

In a preferred embodiment the method produces a product, which is a composite in which the mass derived from the matrix and the infiltrant species remain chemically distinct: [Amatrix+Binfiltrant=still A+B but as a composite].

In yet another embodiment of the invention a method is provided which further comprises subjecting the sintered ceramic to at least one additional step designed to remove any residual porosity that may be present in the sintered ceramic. The at least one additional step may be a heating step in which the sintered ceramic is heated to a temperature sufficient to provide a fully dense ceramic. Preferably the temperature of the heating step does not exceed about 600° C.

In a separate embodiment of the invention, a method is provided for producing a sintered ceramic from a porous solid metal oxide matrix, the method comprising: (a) contacting a solid metal oxide matrix having contiguous interstitial pores with a preselected infiltrating liquid medium; (b) allowing the liquid medium to infiltrate the interstitial pores of the matrix under conditions effective to cause the dissolution of mass from the matrix; (c) allowing the liquid medium to transport the dissolved mass under conditions effective to cause the re-precipitation of the transported mass within the matrix, such that a sintered ceramic is obtained. Once again the preselected infiltration liquid medium may comprise preselected infiltrant species mixed with a suitable liquid. Moreover the sintered ceramic may comprise a mixed metal oxide. Preferably, the mixed metal oxide may be selected from an oxide of a Group Ia metal, a Group IIb metal, a Group IIIb metal, a Group IVb metal, or an oxide of a Group Vb metal. The metal oxide may also comprise an oxide of a transition metal, an oxide of a lanthanide metal, or an oxide of an actinide metal. In one embodiment of the invention the infiltrant species comprises a salt of at least one type of metal or a mixture of metal salts. Alternatively an infiltrant species may be selected from chemical species that provide ions of a Group Ia, Group IIb, Group IIIb, Group IVb, Group Vb, transition, lanthanide, actinide metal or mixtures thereof. The counterions of the above-mentioned ions may also be selected from negatively charge inorganic or organic moieties.

In a preferred embodiment the sintered ceramic produced by the method of the invention comprises a substantially dense solid, more preferably, fully dense. Also preferred are sintered ceramics that may be characterized as having a residual porosity of about 15 percent or less by volume. The shape and size of the starting porous matrix, according to a preferred method, is retained substantially in the sintered ceramic. However, the method of the invention can also produce a sintered ceramic that comprises a mixed metal oxide whose molar volume is greater than that of the starting metal oxide matrix. In yet another embodiment the invention can produce a sintered ceramic that comprises a mixed metal oxide whose molar volume is lower than that of the starting metal oxide matrix. Preferably the conditions of step (b), step (c) or both in the method described above include conditions no harsher than those encountered in a functioning autoclave. Stated in a different way the conditions of step (b), step (c) or both in the method described above preferably do not exceed temperatures of about 250° C. and do not exceed pressures of about 5 atmospheres.

The preceding examples and preferred embodiments are meant to illustrate the breadth of the invention and should not be taken to limit the invention in any way. Other embodiments will surely be apparent to those of ordinary skill in view of the detailed descriptions provided in this disclosure. Such other embodiments are considered to fall within the scope and spirit of the invention, which is limited solely by the following claims.

What is claimed:

1. A method of producing a monolithic body from a porous matrix, comprising:
   (i) providing a porous matrix having interstitial spaces and comprising at least a first reactant;
   (ii) contacting the porous matrix with an infiltrating medium that carries at least a second reactant;
   (iii) allowing the infiltrating medium to infiltrate at least a portion of the interstitial spaces of the porous matrix under conditions that promote a reaction between the at least first reactant and the at least second reactant to provide at least a first product, wherein a reaction temperature is less than about 250° C.; and
   (iv) allowing the at least first product to form and fill at least a portion of the interstitial spaces of the porous matrix, thereby producing a monolithic body, wherein the first product does not comprise barium titanate,
   wherein the step (iv) further comprises aging the monolithic body.

2. The method of claim 1, wherein the first reactant comprises a metal oxide, metal hydroxide, metal sulfate, metal fluoride, metal titanate, or a combination thereof.

3. The method of claim 1, wherein the porous matrix further comprises an inert fill material that decomposes when heated.

4. The method of claim 1, wherein the second reactant comprises an oxalate, a carbonate, a sulfate, a phosphate, a citrate, a metal ion, a mixture of metal salts, or a combination thereof.

5. The method of claim 1, wherein the infiltrating medium is a non-aqueous solution.

6. The method of claim 1, wherein the first product is formed by ion addition, ion substitution, disproportionation, precipitation, or a combination thereof.

7. The method of claim 1, further comprising repeating the steps (ii) to (iv) at least once.

8. A method of producing a non-barium titanate sintered ceramic, comprising:

(i) providing a porous matrix having interstitial spaces and comprising at least a first reactant;
(ii) contacting the porous matrix with an infiltrating medium that carries at least a second reactant;
(iii) allowing the infiltrating medium to infiltrate at least a substantial portion of the interstitial spaces of the porous matrix under conditions that include a reaction temperature of less than about 250° C. and a reaction pressure of less than about 70000 psi and which promote a reaction between the at least first reactant and the at least second reactant to provide at least a first product; and
(iv) allowing the at least first product to form and fill at least a substantial portion of the interstitial spaces of the porous matrix, thereby producing a non-barium titanate sintered ceramic.

9. The method of claim 8, wherein the porous matrix comprises a metal oxide.

10. The method of claim 8, wherein the second reactant comprises a salt of at least one type of metal.

11. The method of claim 8, wherein the reactant in step (iv) is formed by ion addition, ion substitution, disproportionation, precipitation or a combination thereof.

12. A method of producing a composition, comprising:
(i) providing a porous matrix having a molar volume;
(ii) immersing at least a portion of the porous matrix in an infiltrating medium having a reactant; and
(iii) forming a product by reacting at least some of the reactant with at least a portion of the matrix to provide a composition having an interconnecting microstructure, wherein a reaction temperature is less than about 250° C., wherein the product has a molar volume,
wherein the molar volume of the matrix before step (iii) is smaller than that of the product after step (iii).

13. The method of claim 12, wherein the solid matrix does not dissolve in the infiltrating medium readily.

14. The method of claim 12, wherein the matrix comprises an inert fill material.

15. The method of claims 12, wherein the product has a net shape the same as the porous matrix.

16. A method of producing a monolithic body from a porous matrix, comprising:
(i) providing a porous matrix having interstitial spaces and comprising at least a first reactant;
(ii) contacting the porous matrix with an infiltrating medium that carries at least a second reactant;
(iii) allowing the infiltrating medium to infiltrate at least a portion of the interstitial spaces of the porous matrix under conditions that promote a reaction between the at least first reactant and the at least second reactant to provide at least a first product, wherein a reaction temperature is less than about 250° C.; and
(iv) allowing the at least first product to form and fill at least a portion of the interstitial spaces of the porous matrix, thereby producing a monolithic body, wherein the first product does not comprise barium titanate,
wherein the monolithic body is produced in step (iv) by Ostwald ripening.

17. The method of claim 16, wherein the monolithic body has a residual porosity of about 15 percent or less by volume.

18. A method of producing a composition, comprising:
(iii) providing a porous matrix having a molar volume;
(iv) immersing at least a portion of the porous matrix in an infiltrating medium having a reactant; and
(iii) forming a product by reacting at least some of the reactant with at least a portion of the matrix to provide a composition having an interconnecting microstructure, wherein a reaction temperature is less than about 250° C., wherein the product has a molar volume;
wherein the molar volume of the matrix before step (iii) is larger than that of the product after step (iii).

19. The method of claim 18, wherein the solid matrix does not dissolve in the infiltrating medium readily.

20. The method of claim 18, wherein the matrix comprises an inert fill material.

21. The method of claims 18, wherein the product has a net shape the same as the porous matrix.

* * * * *